United States Patent
Cui et al.

(10) Patent No.: US 10,182,225 B1
(45) Date of Patent: Jan. 15, 2019

(54) PROCESSING IMAGES TO REMOVE PRECIPITATION

(71) Applicant: Amazon Technologies, Inc., Seattle, WA (US)

(72) Inventors: Chengwu Cui, Redmond, WA (US); Barry James O'Brien, Seattle, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 15/253,602

(22) Filed: Aug. 31, 2016

(51) Int. Cl.
| | |
|---|---|
| *H04N 13/239* | (2018.01) |
| *G06K 9/62* | (2006.01) |
| *G06T 7/60* | (2017.01) |
| *H04N 5/225* | (2006.01) |
| *G06K 9/52* | (2006.01) |
| *G06T 7/00* | (2017.01) |

(52) U.S. Cl.
CPC ............ *H04N 13/239* (2018.05); *G06K 9/52* (2013.01); *G06K 9/6215* (2013.01); *G06K 9/6267* (2013.01); *G06T 7/002* (2013.01); *G06T 7/60* (2013.01); *H04N 5/2252* (2013.01); *G06T 2207/10028* (2013.01); *G06T 2207/20076* (2013.01)

(58) Field of Classification Search
CPC ............ H04N 13/0239; H04N 5/2252; G06K 9/6215; G06K 9/6267; G06K 9/52; G06T 7/60; G06T 7/002; G06T 2207/10028; G06T 2207/20076
See application file for complete search history.

(56) References Cited

U.S. PATENT DOCUMENTS

| | | | | |
|---|---|---|---|---|
| 9,180,756 | B2 | 11/2015 | Lee et al. | |
| 2007/0053671 | A1* | 3/2007 | Garg | G01W 1/14 396/77 |
| 2009/0252430 | A1* | 10/2009 | Hou | G06T 5/002 382/254 |
| 2013/0004065 | A1* | 1/2013 | Ma | G06T 5/005 382/165 |
| 2014/0214255 | A1* | 7/2014 | Dolgov | G05D 1/0248 701/23 |

(Continued)

OTHER PUBLICATIONS

Office Action for U.S. Appl. No. 15/253,551, dated Apr. 2, 2018, Cui, "Image-Based Weather Condition Detection", 21 pages.

(Continued)

*Primary Examiner* — Christopher S Kelley
*Assistant Examiner* — Nasim N Nirjhar
(74) *Attorney, Agent, or Firm* — Lee & Hayes, P.C.

(57) ABSTRACT

Images captured by a camera system can be processed to detect precipitation in one or more of the images, and to generate a reconstructed image(s) without the precipitation, or with a reduced amount of the precipitation. Detection of precipitation can be based on a difference between a first feature in a first image and a second feature in a second image that corresponds to the first feature, where the first and second images were captured by different cameras at different times. A determination as to whether precipitation is present in the first image and the second image can be based at least in part on a disparity between the first feature and the second feature.

20 Claims, 13 Drawing Sheets

(56) References Cited

U.S. PATENT DOCUMENTS

| | | | |
|---|---|---|---|
| 2014/0286566 A1* | 9/2014 | Rhoads | H04N 13/0275 |
| | | | 382/154 |
| 2014/0363045 A1* | 12/2014 | Wu | G06T 5/002 |
| | | | 382/103 |
| 2016/0328832 A1* | 11/2016 | Jeon | G06T 5/40 |
| 2017/0061217 A1 | 3/2017 | Cha et al. | |

OTHER PUBLICATIONS

Zou, et. al., "Illumination Invariant Face Recognition: A Survey", 2007, IEEE, 8 pages.

\* cited by examiner

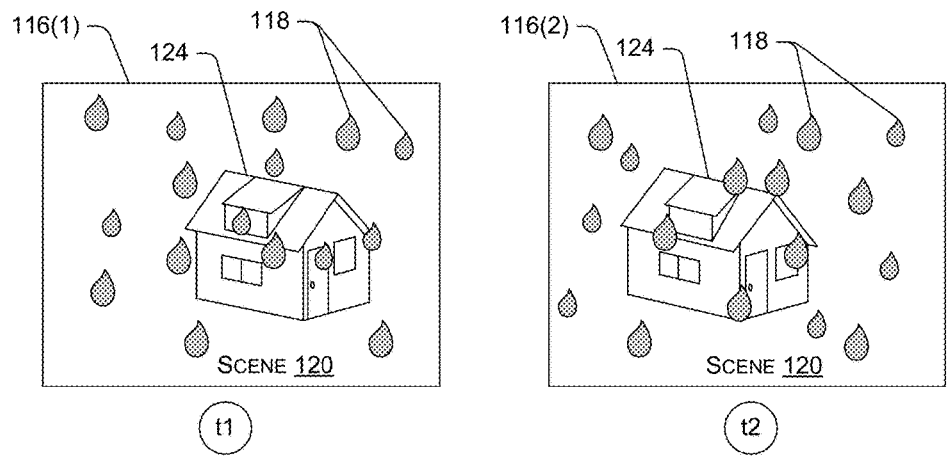
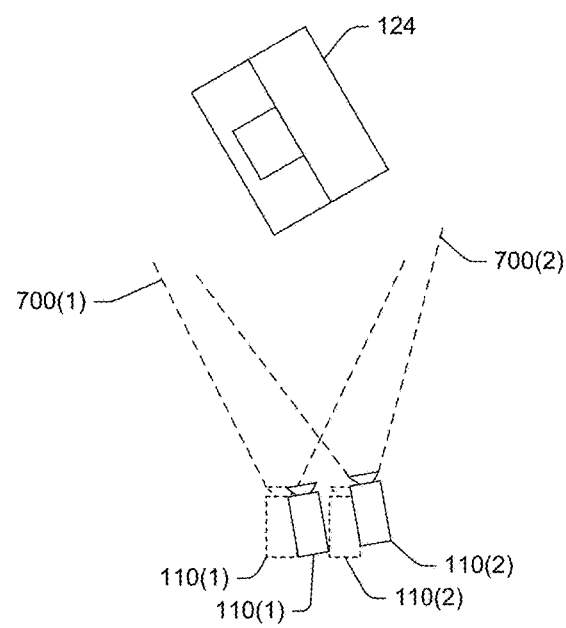
Fig. 7

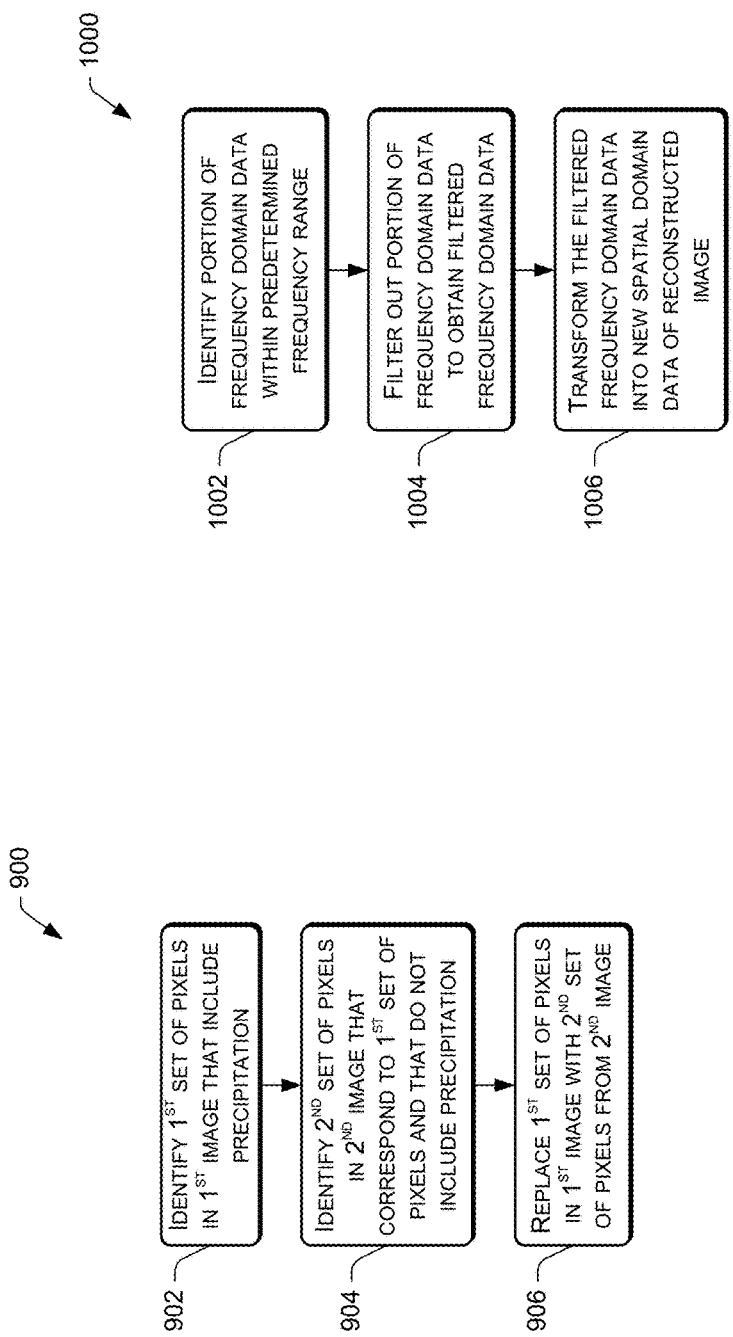

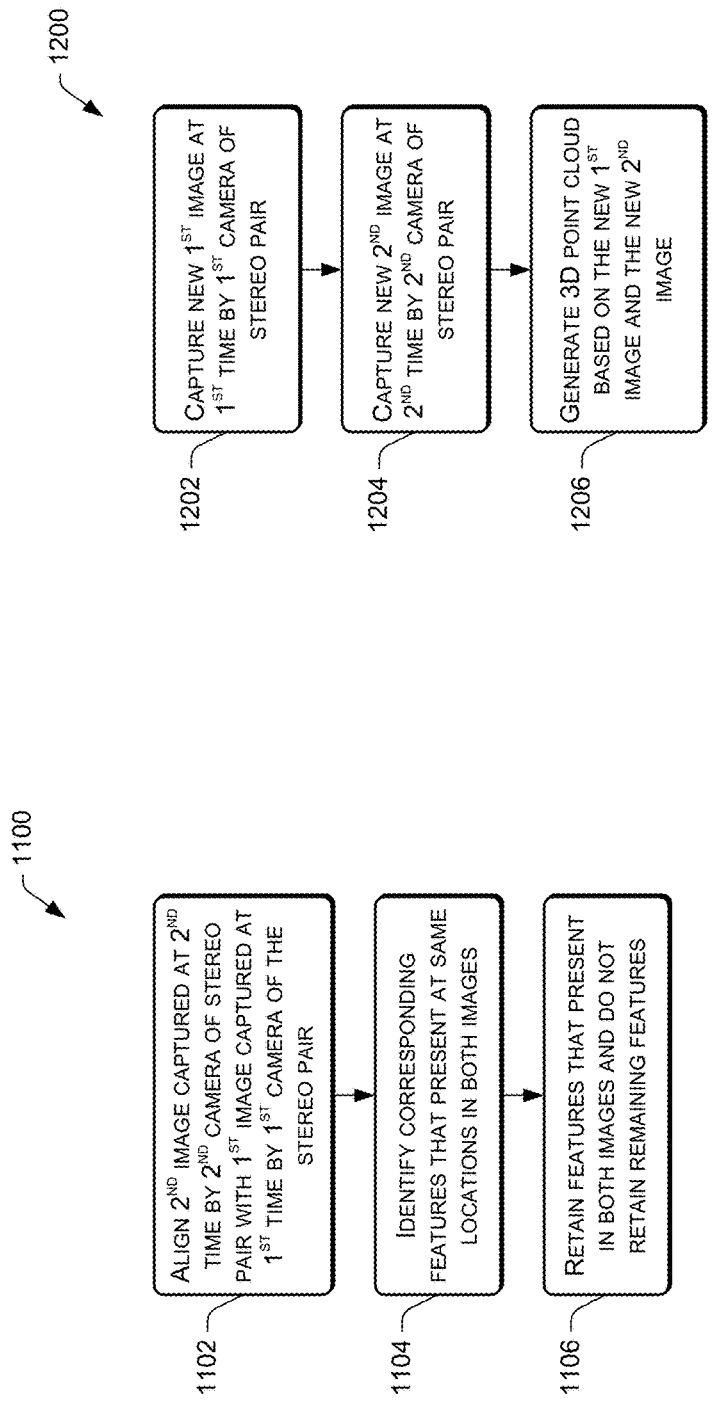

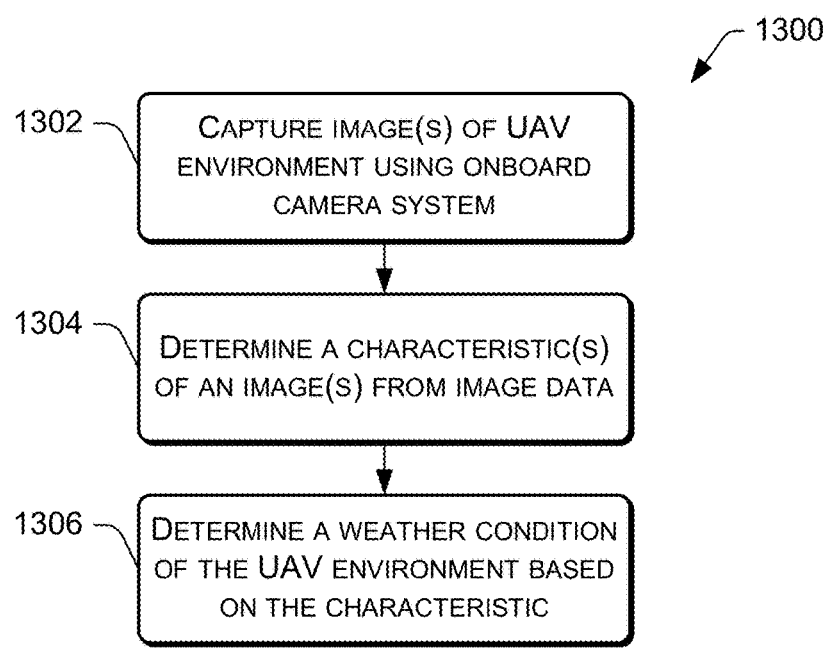

PROCESSING IMAGES TO REMOVE PRECIPITATION

BACKGROUND

Unmanned aerial vehicles (UAVs) are used by hobbyists, some commercial entities, and various militaries. Many UAVs include an integrated camera system to capture imagery of the UAV's environment. These captured images can be used for various purposes. As one example, the images can be used to allow the UAV to fly autonomously to a destination without a human operator controlling the UAV in any respect. For instance, the UAV can capture images of its environment during flight, and utilize the captured images for navigational purposes (e.g., determining its location, trajectory, etc.), safety determinations (e.g., object detection and avoidance), or to build up knowledge of the UAV's environment (e.g., building a three-dimensional (3D) model of the UAV's environment).

When it is raining or snowing in the UAV's environment, however, it may be much more difficult for the UAV to use images for autonomous flight purposes because the rain or snow may partially occlude objects of interest (e.g., buildings, trees, etc.) in the captured images. Furthermore, in the process of building a 3D model of the UAV's environment from a collection of images, rain or snow that is present in the environment will be included in such 3D models by virtue of rain and snow being real objects that are detectable in image data. Over time, this "noise" caused by the rain or snow is compounded in the 3D model of the environment, thereby degrading the accuracy of the 3D model. This, in turn, makes it difficult for the UAV to discern its true environment during flight.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 7 is a schematic diagram of a technique for capturing images using two cameras of a stereo pair.

FIG. 9 is a flow diagram of an illustrative process for generating a reconstructed image with precipitation at least partially removed therefrom.

FIG. 10 is a flow diagram of an illustrative process for generating a reconstructed image with precipitation at least partially removed therefrom according to another embodiment.

FIG. 11 is a flow diagram of an illustrative process for generating a reconstructed image with precipitation at least partially removed therefrom according to another embodiment.

FIG. 12 is a flow diagram of an illustrative process for generating a reconstructed image with precipitation at least partially removed therefrom according to another embodiment.

FIG. 13 is a flow diagram of an illustrative process for determining a weather condition of an environment of the UAV based on a characteristic of an image captured by a camera system of the UAV.

DETAILED DESCRIPTION

Figure 1:
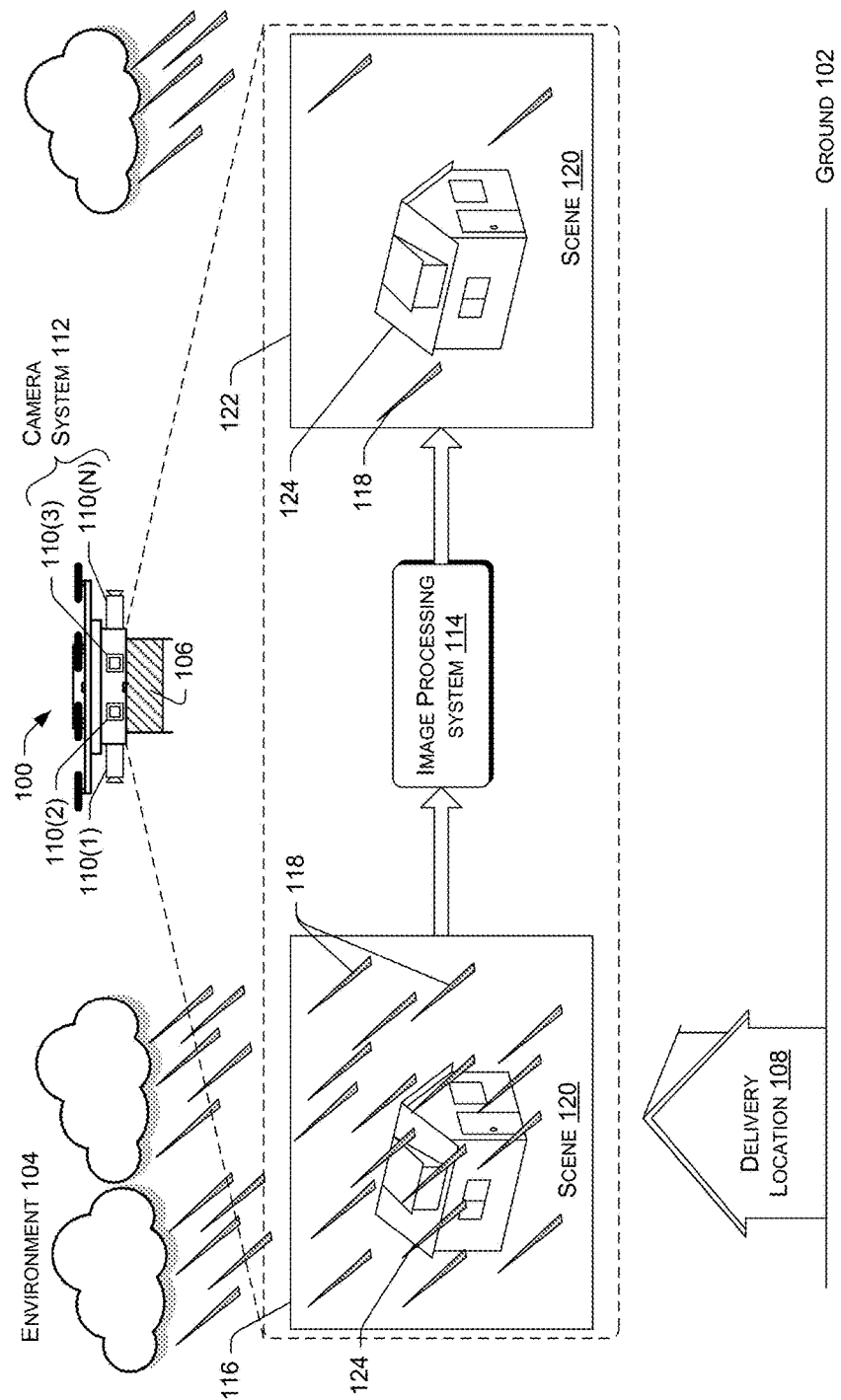
FIG. 1 is a side elevation view of an example unmanned aerial vehicle (UAV) in flight during a rainy day, FIG. 1 further illustrating an example technique of processing images to remove precipitation therefrom.

This disclosure is directed to systems, devices, and techniques for processing images to detect precipitation in one or more of the images, and to generate a reconstructed image(s) without the precipitation, or with a reduced amount of the precipitation. The image processing techniques described herein can be implemented by, or in conjunction with, a camera system of a moving (or movable) vehicle, such as an unmanned aerial vehicle ("UAV"). A UAV can encounter precipitation during flight through an outdoor environment. Because precipitation generally does not inhibit the flight path of a UAV (or any similar moving vehicle), precipitation is often not of concern to the efficacy of the UAV's movement. For instance, rain or snow, by itself, does not typically affect a UAV's flight path. Accordingly, there is little use, if any, in retaining the precipitation in the images captured by the camera system of the UAV.

Image processing systems described herein are configured to receive original images of a scene captured by a camera system, analyze the images to detect precipitation in the scene, and generate a reconstructed image of the scene without the precipitation, or with a lesser amount of the precipitation as compared to an amount of the precipitation in a raw image captured by the camera system. Accordingly, the camera system can comprise one or more image capture devices to capture raw image frames, and one or more processors configured to determine, by analyzing the captured image frames, whether precipitation is present in the captured image frames. If precipitation is detected in the captured image frames, the processor is further configured to generate a reconstructed image using image data associated with at least one of the captured images.

Precipitation can be detected in the images captured by the camera system in various ways. According to embodiments described herein, detection of precipitation in images can be based at least in part on a stereo disparity based detection scheme. An example stereo disparity based detection process can comprise identifying a first feature in a first image captured at a first time by a first image capture device, identifying a second feature in a second image captured at a second time that is different from the first time by a second image capture device, wherein the second feature corresponds to the first feature, and determining that precipitation is present in the first image and the second image based at least in part on a difference between the first feature and the second feature. In some embodiments, a multi-stage approach incorporating the stereo disparity based detection scheme can be utilized to detect precipitation in the images captured by the camera system. The multi-stage approach can utilize stereo disparity based detection for one stage and one or more other types of precipitation detection schemes, as described herein, for one or more additional stages. Thus, one stage of the multi-stage process can be used to confirm the presence of precipitation previously detected by another stage of the multi-stage process. In this manner, the multi-stage approach allows for a more robust precipitation detection system that results in higher accuracy detection and removal of precipitation from captured images.

By generating a reconstructed image that removes some or all of the precipitation detected in a scene, the reconstructed image can be used for various downstream applications that rely on detecting real objects of interest in a scene from captured images of the scene. For example, images that have been processed to remove precipitation therefrom can be used to improve navigational accuracy and/or safety determination systems (e.g., object detection and avoidance systems) of a moving vehicle, such as a UAV. Thus, a moving vehicle can rely on autonomous control systems to move about an outdoor environment. Moreover, the reconstructed images with precipitation removed therefrom can be used to build more accurate 3D point clouds that are representative of the environment surrounding a moving vehicle by ignoring the precipitation present in the environment. Thus, the techniques and systems herein can improve control systems used for autonomous movement of vehicles about an environment, thereby improving safety for people, and protecting structures, within the environment when a vehicle is engaged in autonomous movement.

This disclosure is also directed to systems, devices, and techniques for determining a weather condition from one or more images captured by a camera system, such as a camera system of an unmanned aerial vehicle (UAV). An example process for determining a weather condition based on one or more images comprises capturing, by a camera system of a UAV, one or more images of an environment of the UAV, determining a characteristic of at least one image of the one or more images from image data associated with the at least one image, and determining a weather condition of the environment of the UAV based at least in part on the characteristic of the at least one image.

For purposes of discussion, examples are used herein primarily for illustrative purposes. For example, the techniques described herein are often described with reference to a UAV having an integrated camera system. However, it is to be appreciated that the techniques and systems described herein may be implemented in other systems, such as other types of moving/movable vehicles including, without limitation, automobiles (e.g., cars, trucks, etc.), buses, airplanes, boats, or any other vehicle configured to move about an outdoor environment across, or within, any type of terrain or medium, such as water, air, and so on. Additionally, the systems described herein may be implemented with camera systems that are mounted to a stationary structure (e.g., a building). Such camera systems can include surveillance camera systems used for security, or any type of outdoor camera system that might capture images of a scene in various weather conditions (e.g., precipitation). In these scenarios, camera systems mounted on stationary structures may nevertheless move (e.g., swivel, pivot, rotate, translate, etc.), thereby causing the field of view of the camera system to change as it captures different scenes in the environment of the camera system. At least in the security/surveillance context, the systems and techniques described herein can provide clearer images by removing precipitation therefrom, allowing for improved accuracy of object detection, facial recognition, and the like.

FIG. 1 is a side elevation view of an example unmanned aerial vehicle (UAV) 100 in flight during a rainy day. FIG. 1 depicts the UAV 100 in flight by virtue of the UAV 100 being suspended in air at a distance above ground 102. The UAV 100 can be programmed to fly in an outdoor environment 104 for any suitable purpose. For example, the UAV 100 can be programmed to deliver a package 106 to a delivery location 108 (e.g., a house) by autonomously following a flight path through the environment 104 from an origin location (e.g., a fulfillment center) to the delivery location 108.

Whatever the purpose for flying outdoors, the UAV 100 can encounter variable weather conditions in the environment 104, even during the course of a single journey from the origin to the destination. For example, weather conditions can change rapidly in certain areas such that the UAV 100 can encounter clear, sunny conditions at the start of a journey, and rainy conditions on another part of the journey. At the very least, weather conditions can vary from day to day such that a UAV 100 can encounter sunny conditions one day, and rainy conditions the next day.

The UAV 100 is also shown in FIG. 1 as being equipped with one or more cameras 110(1), 110(2), 110(3) . . . , 110(N) (collectively 110) that are mounted to the UAV 100, each camera 110 being configured to capture images of the environment 104 within a field of view of the camera 110. The camera(s) 110 collectively make up a camera system 112 of the UAV 100. The camera(s) 110 of the camera system 112 can be mounted on the UAV 100 in any suitable fashion. For example, the cameras 110 can be mounted to an outer portion of a structure of the UAV 100, and can be oriented in an outward direction relative to the UAV 100 in order to capture images of the environment 104 that surrounds the UAV 100. In some embodiments, the cameras 110 can be sufficient in number, and mounted on the UAV 100 in such a way, that the camera system 112 can capture substantially all views of the environment 104 (e.g., 360 degrees (°) of viewing angles) around the UAV 100.

The UAV 100 can utilize the camera system 112 in any suitable manner for any suitable purpose. An example purpose for capturing images with the camera system 112 during flight of the UAV 100 is to allow the UAV 100 to fly autonomously to a destination, such as the destination 108, without a human operator controlling the UAV 100 in any respect. For instance, the camera system 112 of the UAV 100 can capture images of the environment 104 during flight, and utilize the captured images for navigational purposes. For example, a navigation system of the UAV 100 can utilize captured images in conjunction with various sensors (e.g., a location sensor, an altimeter, a speedometer, an inertial measurement unit (IMU), etc.) to navigate the UAV 100 along a flight path, wherein the images can be analyzed for object recognition purposes (e.g., recognition of landmarks)

to assist the navigation system in determining a current location of the UAV 100. As another example, in-flight safety determinations can be made based on object detection in images captured by the camera system 112. For example, the UAV 100 can detect the existence of power lines, buildings, or other objects (e.g., flying animals) in the captured images using object detection algorithms, and can alter the flight path temporarily to avoid (e.g., by going around, stopping and hovering, etc.) the detected objects. As yet another example, as images are captured by the camera system 112 over time, the images can be used to generate a 3D point cloud that is representative of at least part of the UAV's 100 environment 104. A 3D point cloud is a 3D visualization of points in 3D space that are computed from a collection of images. For example, a 3D point cloud can be computed by locating recognizable features, such as objects or textures, that appear in two or more images captured by the camera system 112, and calculating respective positions of the recognized features in space using the location, perspective, and other known parameters and characteristics of the camera system 112 and/or the UAV 100 that are associated with the images.

In order to utilize captured images for the various purposes mentioned herein, the images can be processed through an image processing system 114 of the UAV 100. The image processing system 114 can be implemented as hardware, software, or a combination of the two. In some embodiments, portions of the image processing system 114 can be implemented in individual ones of the cameras 104 of the camera system 112, such as in graphics processing units (GPUs) and low level image processing modules of the cameras 104. The image processing system 114 can implement various pre-processing operations in order to compensate for known defects caused by the cameras 104, as well as various post processing operations, including, without limitation, rectification, general de-noising operations (e.g., compensating for known sensor noise), and so on. In addition, the image processing system 114 can utilize a stereo pair(s) of cameras 104, such as the camera 110(2) and the camera 110(3) of FIG. 1, to capture two images of a scene from two different perspectives (i.e., the cameras 110(2) and 110(3) are separated by a known distance), and to obtain disparity data from recognized features in the images. The disparity data can be converted into a depth map to populate the 3D point cloud of the environment 104.

As shown in FIG. 1, the image processing system 114 is further configured to process an input image 116 by analyzing the image 116 (sometimes along with additional images) to detect precipitation 118 in a scene 120 captured by the image 116, and to generate a reconstructed image 122 of the scene 120 without the precipitation 118, or, as shown in FIG. 1, with a lesser amount of the precipitation 118 as compared to an amount of the precipitation 118 in an input image 116 captured by the camera system 112.

Although FIG. 1 shows the precipitation 118 in the form of rain, it is to be appreciated that "precipitation 118" can come in various forms, including, without limitation, rain, snow, drizzle, sleet, freezing rain, graupel, hail, and the like. Thus, "precipitation," as used herein means any product of the condensation of atmospheric water vapor that falls under gravity. Accordingly, the precipitation 118 that is present in image 116 is of a dimension, shape, and pattern that corresponds to rain, but the precipitation 118 in other forms (e.g., snow, hail, etc.) can exhibit other dimensions, shapes, and forms. In any case, as shown in FIG. 1, the precipitation 118 in the image 116 partially (sparsely) blocks real objects 124 of interest in the image 116. In FIG. 1, the real object 124 in the image 116 is a house that represents the delivery location 108 in the example where the UAV 100 is delivering the package 106 to the delivery location 108. Accordingly, if the unprocessed image 116 with the precipitation 118 were to be used by navigation systems, object detection and avoidance systems, and/or 3D point cloud generation systems of the UAV 100, the presence of the precipitation 118 within the image 116 can adversely impact such systems and algorithms that are used to allow the UAV 100 to engage in autonomously flight. For example, if the unprocessed image 116 was used by an object detection and avoidance system of the UAV 100, the system might fail to identify the object 124, or the system might misidentify the size or location of the object 124, and/or the distance of the object 124 from the UAV 100. In such a scenario, humans and/or animals (e.g., pets) within the vicinity of the UAV 100 can be endangered if the UAV 100 were to not recognize a real object 124 accurately. In addition, property, including the UAV 100 itself, can be damaged by a UAV being unable to discern its environment 104 accurately.

Accordingly, the example image processing technique shown in FIG. 1 for removing precipitation from an input image 116 improves safety of humans, animals, and property in the vicinity of the UAV 100 as it flies through the environment 104. In some embodiments, detection of precipitation by the image processing system 114 is accomplished by implementing at least a stereo disparity based detection scheme where a first feature (or first set of features) in a first image captured by a first camera 110(2) is identified, a second feature (or second set of features) in a second image captured by a second camera 110(3) is identified, and the presence of precipitation 118 in the first image and the second image is based at least in part on a difference (e.g., an image difference or frame difference detectable by machine vision techniques) between the first feature(s) and the second feature(s).

Figure 2:
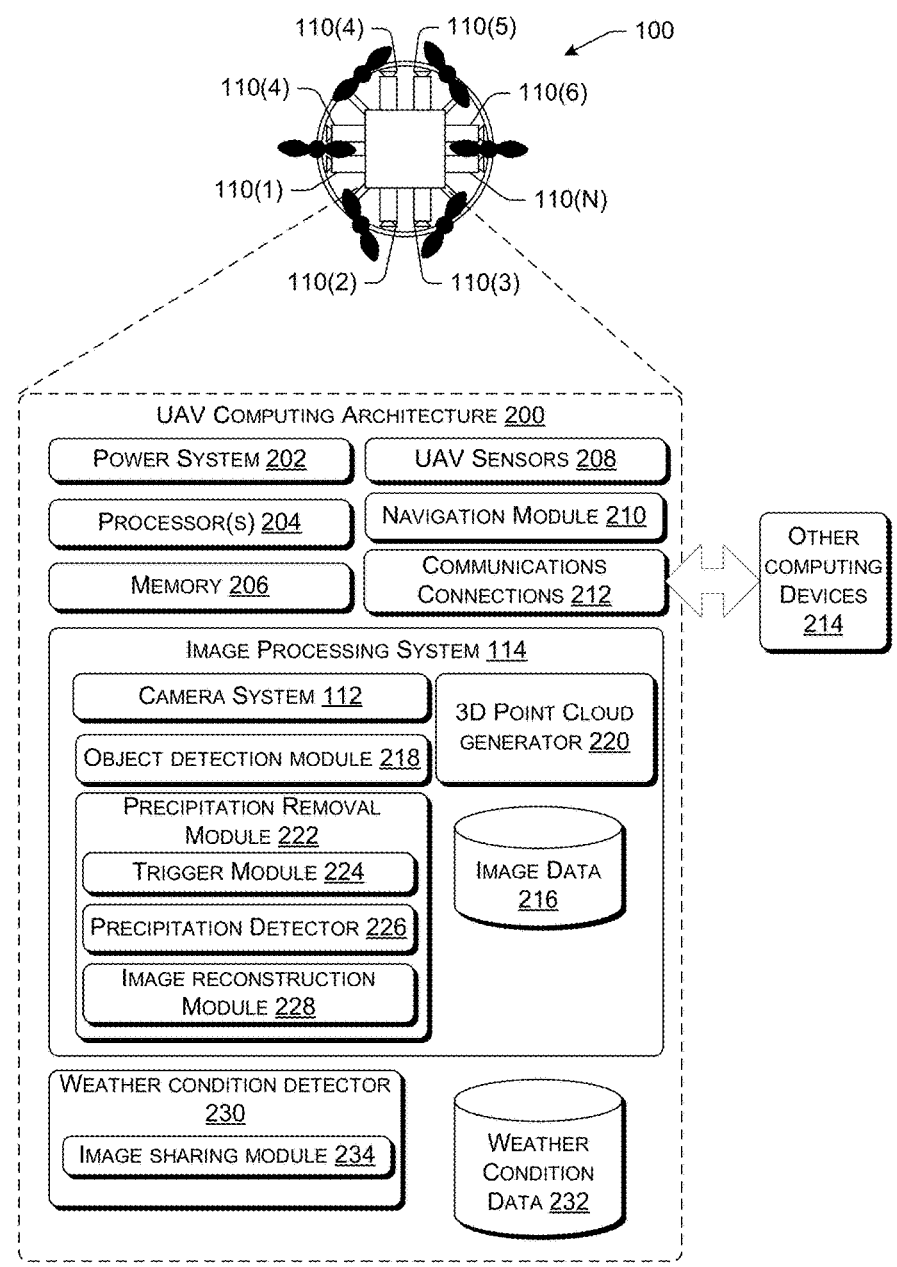
FIG. 2 is a top elevation view of an example UAV, and a block diagram of an example computing architecture of the UAV.

FIG. 2 is a top elevation view of an example UAV 100, and a block diagram of an example computing architecture 200 of the UAV 100. The UAV 100 may be implemented as virtually any type of aircraft. The UAV 100 can include a plurality of propellers (also called rotors) and associated motors of any number, in any form (e.g., graphite, carbon fiber, etc.), and any size sufficient to lift the UAV 100 and any inventory/payload (e.g., the package 106) engaged by the UAV 100 so that the UAV 100 can navigate through the air, for example, to deliver an inventory item to a delivery location (or destination) 108. In some implementations, the UAV 100 may be a multi-rotor (multi-propeller) vertical takeoff and landing vehicle, such as a quadcopter, octocopter, or any other multi-rotor aerial vehicle. While the implementations of the UAV 100 discussed herein utilize propellers to achieve and maintain flight, in other implementations, the UAV 100 may be configured in other manners. For example, the UAV 100 may include at least one fixed wing and/or a combination of both propellers and fixed wings to provide at least some upward lift during forward flight of the UAV 100. The UAV 100 may be configured to transition from rotor flight to a fixed-wing flight during operation. For example, the UAV 100 may utilize one or more propellers to enable takeoff and landing, and a fixed wing configuration or a combined wing-and-propeller configuration to sustain forward flight while the UAV 100 is airborne, such as by redirecting propellers from a lift configuration to a forward propulsion configuration when the UAV 100 includes at least one wing that provides upward lift. In addition, alternative methods of upward and/or forward propulsion may be utilized. For example, fans, jets, turbojets, turbo fans, jet engines, and the like may be used to propel the UAV 100.

In general, the UAV 100 may comprise external components (e.g., the cameras 110), as well as internal components that can be enclosed within a protective enclosure or housing. At least some of these components of the UAV 100 are shown in block diagram form as components that make up a computing architecture 200 of the UAV 100. The architecture 200 includes a power system 202 configured to provide power to various components of the UAV 100 that require electricity to operate. The power system 202 may include any suitable type of power source, such as one or more batteries (e.g., rechargeable batteries), combustion engines, solar panels, and the like configured to generate and provide electrical power to various components of the UAV 100.

The architecture 200 of the UAV is further shown as being equipped with one or more processors 204 and one or more forms of non-transitory computer-readable memory 206. In general, the processor(s) 204 can include any suitable type of processor(s) to the techniques and operations described herein. As such, the processor(s) 204 can include general-purpose or embedded processors implementing any of a variety of instruction set architectures (ISAs), such as the x86, PowerPC, SPARC, or MIPS ISAs, or any other suitable ISA. The processor(s) 204 can further include application specific processors, such as graphics processing units (GPUs) configured to process images captured by the camera system 112. As such, the image processing system 114 introduced in FIG. 1, and described in more detail below, can utilize one or more of the processor(s) 204 (e.g., GPUs) to perform at least some of the operations described herein with references to components of the image processing system 114.

The memory 206 may be configured to store executable instructions and data that are accessible by the processor(s) 204. In various implementations, the memory 206 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are stored within the memory 206. In other implementations, program instructions and/or other data may be received, sent, or stored upon different types of computer-accessible media, such as non-transitory media, or on similar media separate from the memory 206. Generally speaking, a non-transitory, computer readable storage medium may include storage media or memory media such as flash memory (e.g., solid state memory), magnetic or optical media (e.g., disk) coupled to various components of the architecture 200. It is to be appreciated that various software modules described with reference to the architecture 200 can be stored in the memory 206 for execution by the processor(s) 204 to implement the techniques and operations described herein. Furthermore, data, such as images captured by the camera system 112, can be stored in the memory 206 as well.

The architecture 200 can comprise one or more UAV sensors 208 that are configured to sense various types of parameters that can be utilized by various components of the architecture 200. The UAV sensors 208 can include, without limitation, a location sensor (e.g., a global positioning system (GPS) receiver), an inertial measurement unit (IMU) (including an accelerometer, a gyroscope, and/or a magnetometer), a speed/velocity sensor (or speedometer), a revolutions per minute (RPM) sensor, an altimeter (e.g., a barometric altimeter), a fuel gauge, atmospheric sensors (e.g., a temperature sensor or thermal sensor, an atmospheric pressure sensor (barometer), humidity sensor, an airflow sensor (wind speed sensor), etc.), and/or a microphone to sense sound in the vicinity of the UAV 100.

The architecture 200 can further include a navigation module 210 configured to control the flight of the UAV 100 along a flight path that is stored in the memory 206. The navigation module 210 can utilize individual UAV sensors 208 (e.g., a location sensor, an altimeter, a speedometer, an IMU, etc.) to navigate the UAV 100 along a flight path, controlling how the UAV 100 maneuvers along a flight path as it monitors location, altitude, speed, acceleration, pitch, roll, yaw, and other relevant parameters provided by the UAV sensors 210. In addition, the navigation module 210 can utilize images captured by the camera system 112 to navigate, such as by detecting landmarks, the horizon, or any other suitable features of interest in the captured images. The navigation module 210 can utilize an object detection and avoidance system as an emergency flight path adjustment measure when objects are detected by the UAV sensors 208 and/or from analysis of images captured by the camera system 112. The navigation module 210 can also utilize a 3D point cloud generated by the image processing system 114 for navigational purposes.

The architecture 200 can further include communications connections 212 configured to allow data to be exchanged between the UAV 100 and other computing devices 214. For example, the UAV 100 may communicate over a network (e.g., wide area networks (WANs) or local area networks (LANs) and including cable networks, the Internet, cellular networks, wireless networks, or any suitable public or private network), or over short range wireless protocols (e.g., Bluetooth®) when transmitting data to, or receiving data from other UAVs, for example, and so on. Thus, the communications connections 212 can enable wireless communication between other UAVs within a threshold distance of one another, and/or between server computing devices and other UAVs via a wide area computer network, such as the Internet.

The architecture 200 is shown as including the image processing system 114 introduced with reference to FIG. 1. As noted above, the image processing system 114 can be implemented as hardware, software, or a combination of the two. Accordingly, the camera system 112 is shown as being part of the image processing system 114. It is to be appreciated, however, that components shown outside of the image processing system 114 in FIG. 2 can be utilized by the image processing system 114 (e.g., processors 204, such as GPUs), and as such, those components that are utilized by the image processing system 114 can be considered to be part of the image processing system 114 for purposes of this disclosure.

The camera(s) 110 that make up the camera system 112 can include any suitable type of image capture device, such as one or more cameras that continuously detect image data (i.e., captured video in the form of image frames captured at any suitable frame rate) in a field of view(s) of the camera(s) 110. In some embodiments, a stereo pair of cameras can be used as a depth camera to capture image data with "depth information." In addition to utilizing a stereo pair of cameras for obtaining depth information, any suitable technique can be utilized for augmentative depth information, such as time-of-flight (ToF) imaging, structured light imaging, and the like. The cameras 110 can utilize any suitable type of image sensor(s), such as charge-coupled device (CCDE) sensors, complementary metal-oxide-semiconductor (CMOS) sensors, as well as infrared (IR) sensors, or some combination thereof. Furthermore, the cameras 110 of the camera system 112 can include light sources, such as "flashes" any suitable form, including light emitting diode (LED) light sources, and the like to provide active illumination. The active illumination light sources can provide additional light to that of the ambient light in the environment to illuminate a scene 120 and/or objects 124 in the scene 120.

As images are captured by the camera system 112, image data 216 pertaining to the captured images can be stored in the memory 206 of the UAV 100. The image data 216 can include any suitable image-related data including pixel values, color data, brightness data, contrast data, blur data, disparity data, depth data, time data (e.g., timestamps), geolocation data, and so on. The image data 216 can pertain to raw (pre-processed) images captured by the camera system 112 as well as processed images (e.g., processed to remove precipitation), as described herein. Furthermore, portions of the image data 216 can be retained indefinitely and/or discarded (i.e., deleted from the memory 206) after a predetermined amount of time, or upon reaching a storage capacity limit in the memory 206. For example, an operator of the UAV 100 can periodically purge some or all of the image data 216 to free up memory space, or the UAV 100 itself can discard portions of the image data 216 after it is used for allowing the UAV 100 to engage in autonomous flight, after a predetermined amount of time, or after storage capacity limits are reached.

The image processing system 114 is shown as including an object detection module 218 configured to detect objects 124 of interest in images of a scene 120 captured by the camera system 112. The object detection module 218 can utilize any suitable object detection algorithm to determine features, such as geometrical shapes including edges, textures, colors, and the like for determining one or more objects 124 in a given scene 120. The data generated by the object detection module 218 can be stored in the image data 216 over time as captured images are processed by the image processing system 114 for utilization by other components of the architecture 200, such as the navigation module 210 when implementing object detection and avoidance measures.

The image processing system 218 can further include a 3D point cloud generator 220 that is configured to generate a 3D point cloud that is representative of at least part of the UAV's 100 environment 104, as described herein. The 3D point clouds themselves, as well as image data relating thereto, can be stored in the image data 216. Over time, the 3D point cloud generator 220 can be utilized to build up knowledge of the UAV's 100 environment 104 during flight.

The image processing system 114 is further shown as including a precipitation removal module 222. The precipitation removal module 222 is configured to process an input image 116 by analyzing the image 116 (sometimes along with additional images) to detect precipitation 118 in a scene 120 captured by the image 116, and to generate a reconstructed image 122 of the scene 120 without the precipitation 118, or, as shown in FIG. 1, with a lesser amount of the precipitation 118 as compared to an amount of the precipitation 118 in a raw image 116 captured by the camera system 112. By generating a reconstructed image 122 of a scene 120 with at least some of the precipitation 118 present in an original image 116 removed therefrom, various modules of the UAV 100, such as the object detection module 218, the 3D point cloud generator 220, and the navigation module 210, among other modules and systems of the UAV 100, can utilize the reconstructed image 122 for purposes of object detection and navigation of the environment 104. Using the reconstructed image 122—which is "clearer" due to removal of precipitation 118 that sparsely occludes objects 124 of interest in the scene 120—improves the safety of humans, animals, and property in the vicinity of the UAV 100 as the UAV 100 flies autonomously through the environment 104. It is to be appreciated that the reconstructed image 122 can comprise a modified input image 116 or a newly created image.

The precipitation removal module 222 can include a trigger module 224 that is configured to determine when to trigger the image processing operations that remove precipitation from images captured by the camera system 112. The trigger module 224 can be utilized because of the possibility that precipitation 118 may not always be present in the environment 104 of the UAV 100, rendering the image processing operations related to removal of precipitation 118 wasteful when precipitation is not present. For example, on a sunny, clear day with no precipitation, the trigger module 224 can determine that captured images can bypass the image processing operations used for precipitation removal, thereby conserving resources of the UAV 100, such as processing resources, power resources (battery), and storage resources that are used to retain image data utilized, or generated, by the process of removing precipitation from images. To be sure, the captured images can nonetheless be stored in the memory 206 as part of the image data 216 despite bypassing the precipitation removal operations. The trigger module 224 can evaluate various criteria, as described herein, to determine when the precipitation removal process should be triggered in the image processing pipeline.

The precipitation removal module 222 can further include a precipitation detector 226 that is configured to detect precipitation 118 in one or more images captured by the camera system 112. The precipitation detector 226 can implement various techniques, as described herein, to detect the presence of precipitation 118 in one or more images. For example, the precipitation detector 226 can utilize at least a stereo disparity based detection scheme that receives a first image captured at a first time by a first image capture device 110 and a second image captured at a second time that is different from the first time by a second image capture device 110, and identifies a first feature (or first set of features) in the first image and a second feature (or second set of features) in the second image, wherein the second feature corresponds to the first feature. Precipitation 118 is determined to be present in the first image and the second image based at least in part on a difference (e.g., an image difference or frame difference) between the first feature(s) and the second feature(s). Additional details of the stereo disparity based detection scheme are described herein with reference to the following figures.

Additional precipitation detection schemes described herein can be utilized by the precipitation detector 226 include, without limitation, a noise pattern based detection scheme, a frame difference based detection scheme, as well as a scheme using characteristics of captured images under control of camera parameters (e.g., detecting brightness of an image that was captured using active illumination). The precipitation detector 226 is configured, in some embodiments, to utilize two or more of these precipitation detection schemes in a multi-stage approach. An example multi-stage approach is described herein at least with reference to FIG. 3. The multi-stage approach allows for a more robust precipitation detection system that results in higher accuracy detection and removal of precipitation from captured images.

The precipitation removal module 222 can further include an image reconstruction module 228 that is configured to generate a reconstructed image 122 of a scene 120 without depiction of the precipitation 118, or with depiction of a lesser amount of the precipitation 118 as compared to an amount of the precipitation 118 depicted in a raw image 116 captured by the camera system 112. It is to be appreciated that the reconstructed image 122 can comprise a modified input image 116 or a newly created image. Various techniques can be utilized to generate a reconstructed image 122, as described herein.

The architecture 200 of FIG. 2 can further include a weather condition detector 230 configured to determine a weather condition, among multiple possible weather conditions, in the environment 104 of the UAV 100 based at least in part on one or more characteristics of one or more images 116 of the environment 104 captured by the camera system 112. Possible weather conditions for determination by the weather condition detector 230 can be stored in the memory 206 of the UAV 100 as weather condition data 232, and may include, without limitation, a sunny weather condition, a precipitation weather condition (e.g., rainy weather condition, snowy weather condition, etc.), a cloudy weather condition (also referred to as an "overcast" weather condition), windy weather condition (including general wind, as well as tornados, hurricanes, and similar wind-related weather conditions), or any combination thereof (e.g., sunny and windy condition, rainy and windy condition, etc.). Accordingly, the weather condition detector 230 allows for using the camera system 112 of the UAV 100 as visual sensors that, in outdoor environments 104, can "see" the weather as the UAV 100 flies through the environment 104. The weather condition detector 230 can access images 116 captured by the camera system 112 that are stored in the image data 216 and that have not been processed by the precipitation removal module 222. In other words, the weather condition detector 230 utilizes images 116 with precipitation present in the scene 120 (when present in the environment 104) as opposed to the reconstructed images 122 that are output by the image reconstruction module 228 to remove precipitation therefrom.

In some embodiments, the weather condition detector 230 can determine a characteristic of an image 116 captured by a single camera 110 based on image data 216 associated with the image 116, and determine a weather condition based at least in part on the characteristic. In other embodiments, multiple image characteristics determined from image data 116 of one or more images captured by one or more cameras 110 can be used to determine the weather condition, or an additional image characteristic(s) can be used to confirm a weather condition determined from the single characteristic.

As the UAV 100 travels through the environment 104, the weather condition detector 230 can determine weather conditions of the environment 104 at multiple different times, such as periodically (once every few seconds, minutes, and so on) or in response to a trigger (e.g., in response to traveling a predetermined distance horizontally with respect to the ground 102 and/or vertically with respect to the ground 102). As weather condition determinations are made, the weather condition determinations can be stored in a weather log within the weather condition data 232. Accordingly, the weather condition determinations made by the weather condition detector 230 can be time-stamped or otherwise associated with a time such that the weather log for the UAV 100 can comprise a history of weather condition determinations and corresponding times at which the weather condition determinations were made. The weather log can further include location data (e.g., a geolocation, latitude and longitude, etc.), as well as altitude data to associate a location of the UAV 100 with a particular weather condition determination.

The weather condition data 232 can maintain information that maps image characteristics to weather conditions, and this information can be referenced by the weather condition detector 230 in making weather condition determinations. Image characteristics can include, without limitation, levels or values associated with brightness (luminance), color, contrast, blur, as well as features (e.g., objects, textures, geometric shapes, etc.). Thus, the information relating image characteristics to weather conditions can relate characteristic value (or level) ranges to respective weather conditions, such as a first range of brightness levels that are associated with a sunny weather condition, a second range of brightness levels that are associated with a cloudy weather condition, and so on. Multiple different image characteristic ranges can be associated with a given weather condition based on whether active illumination is used to capture images or not. For example, a first (e.g., higher) range of brightness levels can be associated with a given weather condition when active illumination is used to capture an image, and a second (e.g., lower) range of brightness levels can be associated with the given weather condition when active illumination is not used to capture an image.

In addition to using images 116 captured by the camera system 112 of the UAV 100, the weather condition detector 230 can utilize images captured by other UAVs, if the UAVs are within a threshold distance of the UAV 100 to share the images with the UAV 100. Accordingly, the weather condition detector 230 can include an image sharing module 234 to transmit images captured by the camera system 112 of the UAV 100 via the communications connections 212 with other UAVs, and to receive images captured by other UAVs via the communications connections 212. Short range wireless communication protocols (e.g., Bluetooth®) can be utilized for this purpose. In some embodiments, sharing of images between the UAV 100 and other nearby UAVs is triggered when the UAV 100 comes within a threshold distance of another UAV that is configured to share images with the UAV 100. If a communication protocol such as Bluetooth® is utilized for wirelessly transmitting images between UAVs, the threshold distance can be about 30 feet. By detecting weather conditions in its environment 104, the UAV 100 can be deployed along with multiple other UAVs as a weather "sensor net" to provide weather condition data to a server computer(s) that can aggregate the weather condition data from multiple UAVs, and provide entities access to weather reports at "macro" and "micro" levels (e.g., weather conditions of an area with a radius of about 1 mile), as will be described in more detail below.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
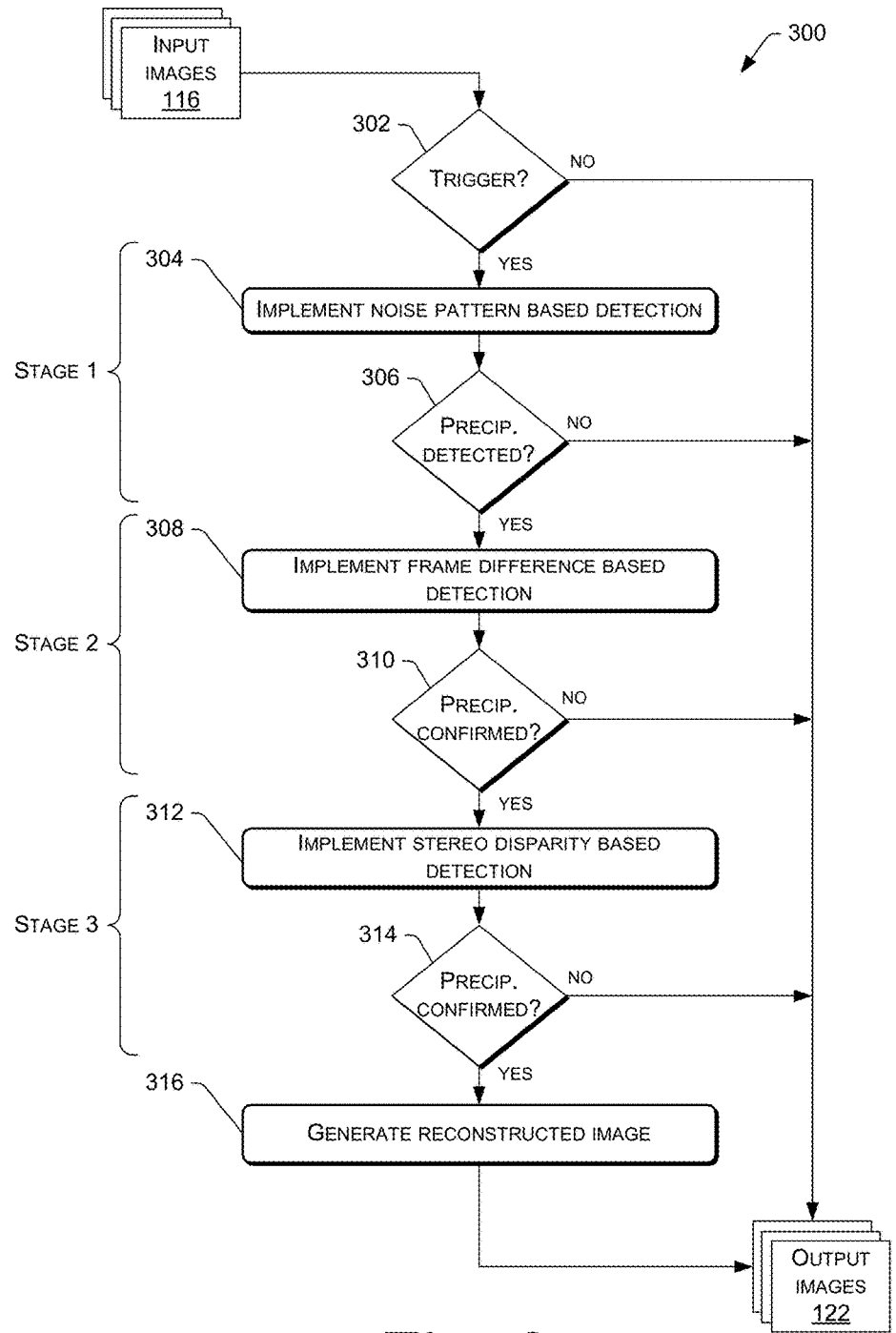
FIG. 3 is a flow diagram of an illustrative process for processing images to detect precipitation in the images and generate a reconstructed image with the precipitation at least partially removed.

FIG. 3 is a flow diagram of an illustrative process 300 for processing input images 116 to detect precipitation 118 in the images 116 and generate a reconstructed image 122 as output with the precipitation 118 at least partially removed. For discussion purposes, the process 300 is described with reference to the UAV 100 and the architecture 200 of FIG. 2. The process 300 can represent a multi-stage approach, as described herein, to detect the presence of precipitation in one or more input images 116 using multiple detection stages.

Input images 116 are shown as being received at decision block 302 of the process 302. It is to be appreciated that the input images 116 represent images that are captured over time by the camera system 112 of the UAV 100. One or multiple cameras 110 of the camera system 112 can be used to capture the input images 116. For example, an individual camera 110 of the camera system 112 can capture input images 116 (e.g., video) at a given frame rate. In some implementations, stereo pairs of cameras 110 can be utilized to capture the input images 116 such that first images 116 are captured by a first camera 110(1) of a stereo pair of cameras and second images 116 are captured by a second camera 110(2) of the stereo pair of cameras. Furthermore, image captures between individual cameras of a stereo pair can be offset from one another so that the first camera 110(1) and the second camera 110(2) capture images at interleaving times (i.e., not simultaneously).

At 302, a determination is made by the trigger module 224 as to whether a precipitation removal process has been triggered. A sub-process for evaluating one or more criteria at 302 to determine whether the precipitation removal process has been triggered will be described with reference to FIG. 4. The decision at 302 can include determining whether a probability of precipitation being present in the environment 104 of the UAV is above a threshold probability based on one or more criteria, including, without limitation, weather report information indicating a likelihood precipitation in the forecast of weather at a location where the UAV 100 is currently located, weather-related parameters output by one or more of the UAV sensors 208 indicating a likelihood of precipitation in the UAV's 100 environment 104, and/or a degradation level of the 3D point cloud generated by the 3D point cloud generator 220 indicating that precipitation is causing the degradation of the 3D point cloud.

If it is determined at 302 that the precipitation removal process has not been triggered, the process 300 follows the "no" route to output the image 122 without any precipitation removal operations on the input image 116. To be sure, other image processing operations can occur on the input image 116, such as general denoising for image sensor noise, rectification, and so on. However, following the "no" route from 302 means that image processing operations related to the removal of precipitation from the input image 116 are not carried out to save resources of the UAV (e.g., processing resources, power resources, storage resources, etc.).

If it is determined at 302 that the precipitation removal process has been triggered, the process 300 follows the "yes" route to 304 where a noise pattern based detection scheme is implemented to detect precipitation in the input image(s) 116. Implementing the noise pattern based detection scheme at 304 can represent a first of multiple stages in a multi-stage process for precipitation detection. In some embodiments, the noise pattern based detection scheme at 304 can comprise transforming spatial domain data of at least one input image 116 into frequency domain data, and then determining whether a portion of the frequency domain data is within a predetermined frequency range associated with a presence of precipitation 118 in the image. A detailed implementation of a noise pattern based detection scheme is described in more detail with reference to FIG. 5.

At 306, a determination is made as to whether precipitation is detected within the image(s) 116 based on the noise pattern based detection scheme at 304. For example, if a portion of the frequency domain data within the predetermined frequency range is identified at 304, the process 300 can follow the "yes" route to 308. If, on the other hand, the frequency data does not include a portion within the predetermined frequency range, the process 300 can follow the "no" route to output the image 122 without any precipitation removal operations on the input image 116.

At 308, and in response to a determination at 306 that precipitation 118 is detected in the image(s) 116 based on the noise pattern based detection scheme at 304, a frame difference based detection scheme is implemented to confirm the presence of precipitation 118 in the input image(s) 116. Implementing the frame difference based detection scheme at 308 can represent a second of multiple stages in a multi-stage process for precipitation detection. In some embodiments, the frame difference based detection scheme at 308 can comprise identifying a first pattern of first features in a first image 116 captured at a first time by the camera system 112, and identifying a second pattern of second features in a second image 116 captured at a second time that is different from the first time by the camera system 112. For example, a single camera 110 of the camera system 112 can capture two sequential images at time, $t_1$, and time, $t_2$. Alternatively, a first camera 110 of a stereo pair of cameras can capture a first image 116 at time, $t_1$, and a second camera 110 of the stereo pair of cameras can capture a second image 116 at time, $t_2$. The amount of time between time, $t_1$, and time, $t_2$, can be on the order of milliseconds, seconds, or any suitable time difference that allows for better detection of precipitation 118 in the first and second input images 116. A difference between the first pattern and the second pattern can then be determined between the sequential image frames at 308. A detailed implementation of a frame difference based detection scheme is described in more detail with reference to FIG. 6.

At 310, a determination is made as to whether precipitation is detected within the image(s) 116 based on the frame difference based detection scheme at 308. For example, if a portion of the difference between the first pattern of first features in the first image 116 and the second pattern of second features in the second image 116 is indicative of the presence of precipitation in the first and second images 116, the process 300 can follow the "yes" route to 312. If, on the other hand, the difference between the first pattern and the second pattern is not indicative of the presence of precipitation in the first and second images 116, the process 300 can follow the "no" route to output the image 122 without any precipitation removal operations on the input image 116.

At 312, and in response to a determination at 308 that precipitation 118 is detected in the image(s) 116 based on the frame difference based detection scheme at 308, a stereo disparity based detection scheme is implemented to confirm the presence of precipitation 118 in the input image(s) 116. Implementing the stereo disparity based detection scheme at 312 can represent a third of multiple stages in a multi-stage process for precipitation detection. In some embodiments, the stereo disparity based detection scheme at 312 can comprise identifying a first feature (or first set of features) in a first image 116 captured at a first time, $t_1$, by a first camera 110 of a stereo pair of cameras, and identifying a second feature (or second set of features) in a second image 116 captured at a second time, $t_2$, that is different from the first time by a second camera 110 of the stereo pair of cameras, wherein the second feature(s) corresponds to the first feature(s). The amount of time between time, $t_1$, and time, $t_2$, can be on the order of milliseconds, seconds, or any suitable time difference that allows for better detection of precipitation 118 in the first and second input images 116. A difference between the first feature(s) and the second feature(s) can then be determined between the sequential image frames captured by each camera of the stereo pair of cameras. A detailed implementation of a frame difference based detection scheme is described in more detail with reference to FIGS. 7 and 8.

At 314, a determination is made as to whether precipitation is detected within the image(s) 116 based on the stereo disparity based detection scheme at 312. For example, if disparity is detected between background features determined at 312, the process 300 can follow the "yes" route to 316. If, on the other hand, the difference between the first and second features does not indicate the presence of precipitation, the process 300 can follow the "no" route to output the image 122 without any precipitation removal operations on the input image 116.

At 316, if precipitation is detected and confirmed via the multiple stages of precipitation detection, a reconstructed image can be generated by the image reconstruction module 228 using image data 216 associated with at least one of the input images 116. It is to be appreciated that the reconstructed image 122 can comprise a modified input image 116 or a newly created image. Various techniques can be utilized for generating a reconstructed image without the precipitation 118 that is present in the input image(s) 116, or with a reduced amount of the precipitation, as will be described below with reference to FIGS. 9-12. A result of the process 300, upon following the "yes" route from the decision at 302, is one or more output images 122 that are generated based on one or more input images 116, where the output image(s) 122 has a reduced amount of precipitation 118 in the output image(s) 122, thereby rendering real objects 124 of interest in the scene 120 more visible to improve the accuracy of object detection, 3D point cloud generation, and other downstream applications that rely on the images captured by the UAV's camera system 100.

In some embodiments, the generation of a reconstructed image 122 at 316 can be performed in response to determining a severity level of the precipitation detected by the multi-stage detection approach. For example, if precipitation is determined to be "light", objects may still be visible at a level that does not warrant generating the reconstructed image 122, and the process can bypass block 316. If, on the other hand, precipitation is determined to be more sever (e.g., heavy rain), which impacts the visibility of objects 124 in the scene 120 to a greater degree, the reconstructed image 122 can be generated at 316. Multiple possible severity levels can be used to classify precipitation 118 in the image 116, such as heavy, medium, light, and so on. Visibility of objects 124 in the scene 120 can be utilized to determine the severity level of the detected precipitation. For example, edge detection of objects, contrast determinations, and the like, as determined from image data 216, can be used to determine the visibility of an object 124, and to classify the precipitation at a severity level among multiple possible severity levels.

It is to be appreciated that any individual block of the blocks 304, 308, and 312 can be performed with the image reconstruction block 316 to implement the process 300, or any combination of the blocks 304, 308, and 312 can be performed in any order and/or in parallel as part of a multi-stage approach for the process 300. For example, the process 300 can follow the "yes" route from 302 to 312 to implement the stereo disparity based detection scheme, and if it is determined at 314 that precipitation is detected in the input images 116 based on the stereo disparity based detection scheme, the reconstructed image 122 can be generated at 316 and output as an output image 122. As another example, the stereo disparity based detection scheme can be performed prior to the noise pattern based detection scheme, and/or prior to the frame difference based detection scheme.

Figure 4:
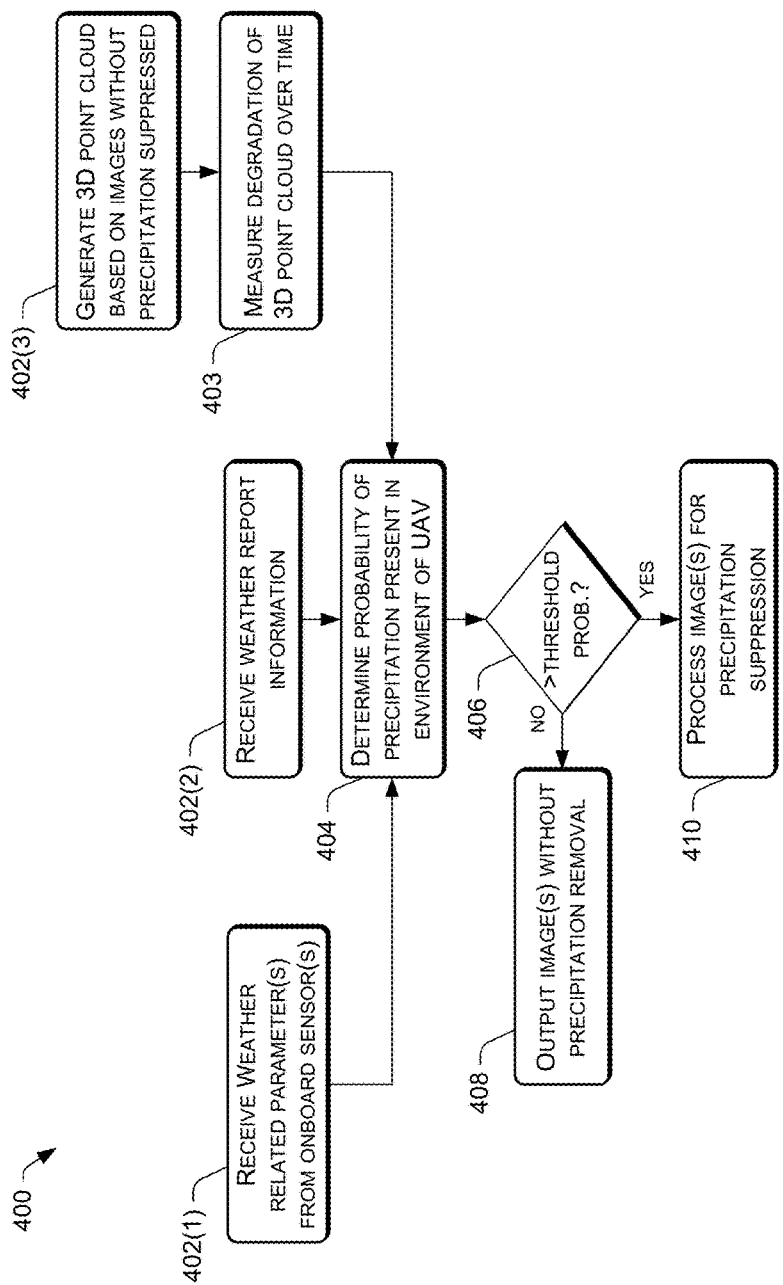
FIG. 4 is a flow diagram of an illustrative process for triggering a precipitation removal process in an image processing pipeline.

FIG. 4 is a flow diagram of an illustrative process 400 for triggering a precipitation removal process in an image processing pipeline, such as the process 300 following the "yes" route from 302. For discussion purposes, the process 400 is described with reference to the UAV 100 and the architecture 200 of FIG. 2. Because various criteria can be evaluated to determine whether the precipitation removal process has been triggered, the process 400 can begin with one or more of blocks 402(1), 402(2), and/or 402(3).

At 402(1), the trigger module 224 can receive one or more output values from one or more of the UAV sensors 208 pertaining to a sensed weather related parameter in the environment 104 of the UAV 100. For example, a humidity sensor (an example of a UAV sensor 208) onboard the UAV 100 can output a detected humidity value that is indicative of the level of humidity in the environment 104 surrounding the UAV 100. As another example, a barometer (an example of a UAV sensor 208) onboard the UAV 100 can output a detected atmospheric pressure value that is indicative of a level of atmospheric pressure in the environment 104. As another example, a temperature sensor (an example of a UAV sensor 208) onboard the UAV 100 can output a detected temperature value that is indicative of a level of the ambient temperature in the environment 104 of the UAV 100. As yet another example, a wind speed sensor (an example of a UAV sensor 208) onboard the UAV 100 can output a detected wind speed value indicative of a velocity of wind in the environment 104 of the UAV 100.

At 404, the trigger module 224 can determine a probability of precipitation being present in the environment 104 of the UAV 100 based at least in part on the level of the weather related parameter detected by the UAV sensor(s) 208. In some embodiments, the determination of the probability of precipitation being present at 404 can be based on multiple values output by multiple UAV sensors 208, such multiple ones of humidity, atmospheric pressure, temperature, and wind speed levels output by the UAV sensors 208. In some embodiments, a confidence level of the probability determined at 404 can be based on a number of the UAV sensors 208 that are utilized in the determination at 404. Accordingly, the determination at 404 can factor the confidence level into the probability determination.

At 406, a determination is made as to whether the probability of precipitation at 404 is above a threshold probability. If the probability that precipitation is present in the environment 104 is below the threshold probability, the process 400 follows the "no" route to 408 where the input image(s) 116 are output without precipitation removal (e.g., following the "no" route from 302 of the process 300 to bypass the precipitation removal process). If, at 406, it is determined that the probability that precipitation is present in the environment 104 meets or exceeds the threshold probability, the process 400 follows the "yes" route to 410 where the input image(s) 116 are processed for precipitation removal (i.e., precipitation detection and generation of a reconstructed image with reduced precipitation, such as the operations of the process 300 following the "yes" route from 302).

As shown in FIG. 4, the determination of the probability at 404 can additionally, or alternatively, take other factors into consideration. For example, at 402(2), the trigger module 224 can receive, via the communication connections 212 and over a computer network, weather report information, such as a probability of precipitation in a location of the UAV 100. Weather report information can include any suitable information, such as humidity, atmospheric pressure, wind speed, and the like, similar to the weather related parameters that the UAV sensors 208 are configured to detect, but this information is collected by other sensors external to the UAV 100, such as third party weather sensors (e.g., weather balloons, satellites, etc.) and reported (i.e., made available over a computer network) for consumption by the UAV 100. Accordingly, the determination at 404 can be based on a received probability of precipitation in the weather report information received at 402(2) and/or calculated from weather parameter measurements in the weather report information. Furthermore, the determination at 404 can be based on a combination of the weather report information and the weather related parameter(s) output by the UAV sensor(s) 208 and received by the trigger module 224 at 402(1).

FIG. 4 also illustrates that the determination of the probability at 404 can be based on blocks 402(3) and 403. At 402(3), the image processing system 114 can process input image 116 captured by the camera system 112 without any precipitation removal operations, and, based on the captured images, the 3D point cloud generator 220 can generate a 3D point cloud. Over time, the 3D point cloud can be updated with new values as additional images are captured and processed, thereby building up knowledge of the environment 104 surrounding the UAV 100. As the 3D point cloud is updated over time, the trigger module 224 can measure a level of degradation of the 3D point cloud at 403. If weather conditions are clear, a degradation level of the 3D point cloud over a given time period can remain at a value that is below a predetermined level of degradation, above which indicates that the 3D point cloud has degraded to a point that is indicative of precipitation being present in the environment 104. Thus, when precipitation is present in the environment 104, the input images 116 will include points pertaining to the precipitation 118 captured in the input images 116, and the degradation level of the 3D point cloud can rise. When the degradation level reaches or exceeds a threshold degradation level, such a condition can be indicative of the likely presence of precipitation in the environment 104 of the UAV 100. A degradation level of the 3D point cloud can be measured based on any suitable data or parameter relating to the 3D point cloud data stored in the image data 216. For example, as the number of points in the 3D point cloud generated for a given environment 104 increases above an threshold number of points (e.g., a number of points above some expected number of points for the 3D point cloud generated for the environment 104 without precipitation), the degradation level may rise to a level that indicating high degradation of the 3D point cloud likely due to precipitation 118 captured in the input image 116 used to generate the 3D point cloud. Accordingly, this degradation level determined at 403 can be taken into consideration in the determination at 404 of the probability of precipitation being present in the environment 104 in addition to the other considerations from 402(1), and 402(2), or as an alternative consideration for the process 400. By carrying out the process 400, the image processing system 114 is configured to conserve resources of the UAV 100 (e.g., processing resource, power resources, and/or storage resources) by selectively processing input images 116 for precipitation removal when it makes sense to do so (i.e., precipitation is likely present in the environment 104 of the UAV 100, as determined by the process 400).

Figures 5, 6:
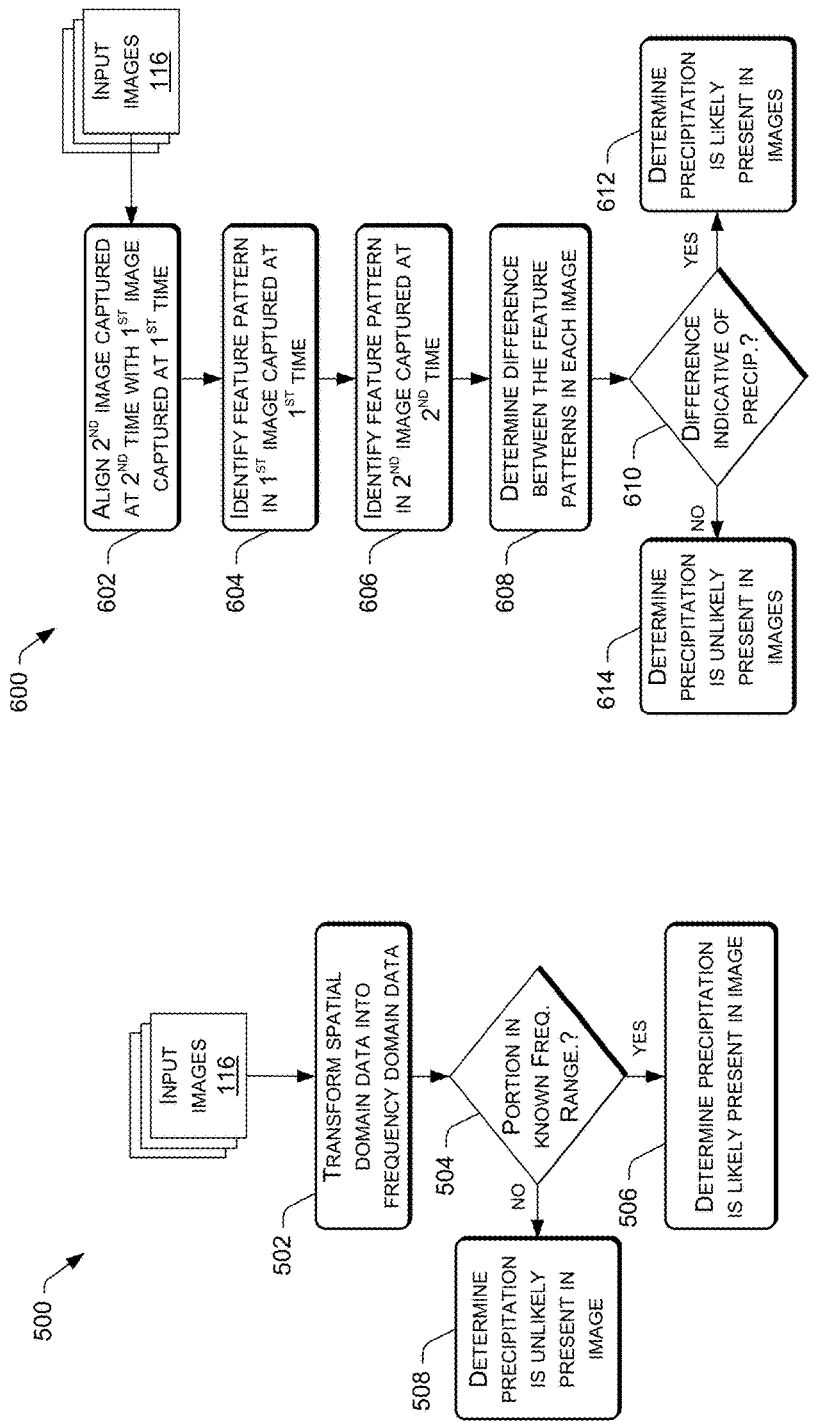
FIG. 5 is a flow diagram of an illustrative process for detecting precipitation in images based on a noise pattern based detection technique.
FIG. 6 is a flow diagram of an illustrative process for detecting precipitation in images based on a frame difference based detection technique.

FIG. 5 is a flow diagram of an illustrative process 500 for detecting precipitation in images based on a noise pattern based detection technique. For discussion purposes, the process 500 is described with reference to the UAV 100 and the architecture 200 of FIG. 2. Furthermore, the process 500 can represent a sub-process of block 304 of the process 300 where the noise pattern based detection scheme is implemented in the process 300.

As noted herein, precipitation 118 captured in images, such as the input image 116 shown in FIG. 1, can partially (sparsely) block or occlude real objects 124 of interest in the scene 120 captured by the image 116. The precipitation 118 captured in the input image 116 can be treated in a similar nature to sensor noise (e.g., known noise caused by an image sensor of a camera 110). Accordingly, the precipitation removal module 222 can model precipitation as noise, and treat the removal of precipitation 118 from the input image 116 as a de-noising problem. The noise pattern in the input image 116 caused by the presence of precipitation 118 in the image can be referred to herein as a "blockage pattern." It is recognized that precipitation 118 captured in an input image 116 can exhibit a unique spatial pattern that carries a noise signature that can be profiled for purposes of detecting the presence of precipitation 118 in the input image 116. This noise signature of precipitation can be exhibited in a predetermined frequency range (or frequency band) when image data 216 relating to the input image 116 is converted from the spatial domain to the frequency domain. Accordingly, the noise pattern based detection scheme can be carried out by the process 500 leveraging these principles of modeling precipitation as noise.

At 502, the precipitation detector 226 can transform spatial domain data (accessed from the stored image data 216) of at least one input image 116 captured by the camera system 112 of the UAV 100 into frequency domain data. This frequency domain data relating to the input image 116 can be referred to as a "frequency image" that represents the scene 120 captured by the image 116 in the frequency domain. In some embodiments, the transformation at 502 comprises computing a Fourier transform (e.g., a Fast Fourier Transform (FFT)) of the input image 116. The spatial domain data of the input image 116 can comprise image data captured by one or more cameras 110 of the camera system 112 that includes, without limitation, a measurement of height (z) and reflectance (a) for each position (x, y) in the two-dimensional plane of the image 116. Accordingly, this spatial domain data (e.g., X, Y, Z, A image data) can be transformed into frequency domain data using a Fourier transform technique to generate a frequency image of the scene 120.

At 504, the frequency domain data pertaining to the input image 116 can be analyzed to determine if a component or portion of the frequency domain data (or frequency image) is within a predetermined frequency range that is associated with a presence of precipitation in the input image 116. The predetermined frequency range can be determined offline based on test images, a portion of the test images including precipitation 118 and another portion of the test images not including precipitation 118. Frequency values and frequency patterns exhibited in the test images with precipitation 118 can be determined to determine a range of frequency values that, if exhibited in a frequency image of a scene 120, indicate the presence of precipitation 118 in the image 116.

If, at 504, the precipitation detector 226 identifies a portion of the frequency domain data that is within the predetermined frequency range, the process 500 follows the "yes" route from 504 to 506 where a determination is made that precipitation is likely present in the image 116. In regards to the process 300, this can represent the determination at 306 that precipitation is detected in the input image 116 based on the noise pattern based detection scheme. In the example of FIG. 3, the multi-stage process 300 can continue to a next stage of the multi-stage process to confirm the detection of precipitation based on the process 500.

If, at 504, the precipitation detector 226 does not identify a portion of the frequency domain data that is within the predetermined frequency range (indicating that precipitation is not likely present in the image 116), the process 500 follows the "no" route from 504 to 508 where a determination is made that precipitation is not likely to be present in the image 116. In regards to the process 300, this can represent at determination at 306 that precipitation is not detected in the input image 116 based on the noise pattern based detection scheme, which can cause the process 300 to bypass remaining stages in the multi-stage process of FIG. 3 to output the input image 116 without any precipitation removal operations.

FIG. 6 is a flow diagram of an illustrative process 600 for detecting precipitation in images based on a frame difference based detection technique. For discussion purposes, the process 600 is described with reference to the UAV 100 and the architecture 200 of FIG. 2. Furthermore, the process 600 can represent a sub-process of block 308 of the process 300 where the frame difference based detection scheme is implemented in the process 300.

Another attribute of precipitation is that the precipitation elements (e.g., raindrops, snowflakes, etc.) are constantly moving in the field of view of the cameras 110 mounted on the UAV 100 (i.e., the precipitation is not fixed or static from a spatial perspective of the scene 120. The process 600 leverages this principle by looking at a difference in feature patterns between two sequential image frames where precipitation, if present in the environment 104, will have moved during the time delay to capture the first image frame and the second image frame, thereby creating different feature patterns in the two sequential image frames.

At 602, the precipitation detector 226 can receive, or otherwise select, two images (or image frames) captured at different times, and perform an alignment operation where the second image captured at a second time, $t_2$, is aligned with a first image captured at a first time, $t_1$. The alignment operation at 602 can be based on the notion that the UAV 100 is moving (i.e., in flight) as the input images 116 are being captured. Therefore, if the camera system 112 (mounted to a moving UAV 100) is moving through an environment 104, two image frames captured sequentially (i.e., at different times) will not capture the same scene 120. If a single camera 110 is used to capture the two images received and aligned at 602, the camera 110 will have moved in space (e.g., translated, rotated, etc.) between the first time, $t_1$, and the second time, $t_2$, causing the field of view of the camera 110 to change between the two successive times, and thereby capturing slightly different scenes, depending on the time delay between the sequentially captured images. For a camera 110 capturing video at a frame rate of 30 frames per second, the scenes between a first image frame and a second image frame will not be dramatically different, but rather, offset by a small amount such that objects 124 in the scene 120 will appear in slightly different locations, or will have moved out of, or into, the field of view of the camera at time, $t_2$. In some embodiments, the alignment operation at 602 can perform an alignment based on known movement parameters relating to the UAV 100, such as the UAV's 100 velocity/speed, pose, altitude, and the like, as determined from output(s) of one or more of the UAV sensors 208, such as an IMU. For example, a determination of how much to adjust the second image frame left, right, up, and/or down to align the second image frame with the first image frame can be based on such movement-related information.

At 604, the precipitation detector 226 can identify a first pattern of first features in the first image captured at the first time by an image capture device 110 of the camera system 112. The precipitation detector 226, at 604, can analyze the input images 116 for features in the image that correspond to precipitation elements (e.g., raindrops, snowflakes, etc.) using any suitable feature detection algorithm. Feature detection in this context can be based on geometry, shape, size, color, contrast, and so on, of pixels and/or groups of pixels in the input images. A precipitation detector 226 trained to identify precipitation elements can identify a pattern of the precipitation elements in the image at 604.

At 606, this feature pattern detection described with reference to the first image at 604 can be repeated for a second image captured at a second time that is different from the first time the first image was captured. Accordingly, the precipitation detector 226, at 606, can identify a second pattern of second features in the second image. The second image can be captured by the same image capture device 110 that captured the first image, or by a different image capture device 110, such as the other camera 110 of a stereo pair of cameras of the camera system 112.

At 608, the precipitation detector 226 can determine a difference between the first pattern identified at 604 and the second pattern identified at 606 by creating a difference frame with a difference feature pattern. An example technique for determining a difference between feature patterns is to create a first mask over the first image according to the first feature pattern, and a second mask over the second image according to the second feature pattern, and then superimposing the masks to determine a difference pattern.

At 610, the precipitation detector 226 can determine if precipitation is likely present in the input image 116 by comparing the difference between the first pattern and the second pattern (i.e., difference feature pattern) determined at 608 to difference feature patterns stored in the memory 206 of the UAV 100. For example, difference frames previously determined from images that include precipitation can be determined and classified as precipitation difference frames, and the difference feature patterns of those difference frames are indicative of difference feature patterns that are created by precipitation in the input images that were used to create the difference frames. Accordingly, if, at 610, it is determined that the difference between the first feature pattern and the second feature pattern are indicative of the presence of precipitation in the input images 116 (i.e., the first image and the second image), the process 600 follows the "yes" route to 612 where a determination is made that precipitation is likely present in the images 116. In regards to the process 300, this can represent the determination at 310 that precipitation is detected in the input images 116 based on the frame difference based detection scheme. In the example of FIG. 3, the multi-stage process 300 can continue to a next stage of the multi-stage process to confirm the detection of precipitation based on the process 600.

If, at 610, the precipitation detector 226 determines that the difference between the first feature pattern and the second feature pattern is not indicative of precipitation (e.g., by not finding a matching difference feature pattern in memory 206 of the UAV 100), the process 600 follows the "no" route from 610 to 614 where a determination is made that precipitation is not likely to be present in the image 116. In regards to the process 300, this can represent at determination at 310 that precipitation is not detected in the input image 116 based on the frame difference based detection scheme, which can cause the process 300 to bypass remaining stages in the multi-stage process of FIG. 3 to output the input image 116 without any precipitation removal operations.

Turning to FIG. 7, another approach to detecting the presence of precipitation 118 within input images 116 is discussed where stereo disparity is utilized as a precipitation detection mechanism. Before discussing FIG. 7, the concept of "disparity" in stereo image pairs is first discussed.

Depth information of a scene 120 can be obtained by matching corresponding features (e.g., pixels or groups of pixels) in a stereo image pair, and estimating the "disparity" of the pair of images based on a distance between the corresponding features. Said another way, a stereo image pair comprises a left image (captured by a first camera 110 of a stereo pair) and a right image (captured by a second camera 110 of the stereo pair that is spaced a known distance from the first camera 110) of the same scene 120. Due to the distance between the two cameras 110 of the stereo pair, the scene 120 is captured from two different viewpoints. If the two images of the stereo image pair are captured at the same time, and then superimposed, the distance between features that correspond to the same location in the scene 120 in the left image and the right image is referred to as "disparity." This disparity value provides information about a relative distance of the cameras 110 in the stereo pair from the location in the scene 120 (i.e., depth information).

FIG. 7 shows a top elevation view of a first camera 110(1) and a second camera 110(2) of a stereo pair that are part of the camera system 112 of the UAV 100. The cameras 110 shown in "dashed lines" represent a location of the cameras 110 at a first time, $t_1$, while the cameras 110 shown in "solid lines" represent a location of the cameras 110 at a second time, $t_2$, after the UAV 100 has moved, since the UAV 100 is in flight from the first time to the second time. The cameras 110 can be capture images of a scene 120, which can include various real objects, such as the object 124, which is a house in the example of FIG. 7 corresponding to the delivery location 108 of FIG. 1.

An example technique for detecting precipitation in the scene 120 involves the stereo image pair capture technique of FIG. 7 in combination with the stereo disparity based detection scheme described in detail with reference to FIG. 8. The image capture technique shown in FIG. 7 includes capturing a first image 116(1) at a first time, $t_1$, by the first camera 110(1) of the stereo pair, which is represented at the bottom of FIG. 7 by the first field of view 700(1) seen by the first camera 110(1) at time, $t_1$. The image capture technique further includes capturing a second image 116(2) at a second time, $t_2$, by the second camera 110(2) of the stereo pair, which is represented at the bottom of FIG. 7 by the second field of view 700(2) seen by the second camera 110(2) at time, $t_2$. The time delay between the first time, $t_1$, and the second time, $t_2$, can be on the order of milliseconds, seconds, or any suitable time delay that results in optimized detection of precipitation. In some embodiments, the first camera 110(1) is configured to capture video (multiple image frames) at a first frame rate, and the second camera 110(2) is configured to capture video (multiple image frames) at a second frame rate, wherein respective times at which the second camera 110(2) captures image frames are offset from respective times at which the first camera 110(1) captures image frames. In this manner, the first camera 110(1) and the second camera 110(2), when used, do not capture image frames simultaneously due to the offset frame rates. In this scenario, the time delay between the first image frame 116(1) and the second image frame 116(2) shown in FIG. 7 can be on the order of milliseconds.

Given that precipitation 118 (e.g., rain, snow, etc.) moves in the scene between the first time, $t_1$, and the second time, $t_2$, the locations of precipitation 118 elements (e.g., raindrops) within the scene 120 change between the first image 116(1) and the second image 116(2). Furthermore, for simultaneously captured stereo image pairs, disparity diminishes as the distance from the stereo pair of cameras 110 increases; beyond a certain distance threshold, there is no detectable disparity between corresponding features in a scene 120. However, the technique shown in FIG. 7 of using a time delay between the capture of the first image 116(1) and the second image 116(2) causes disparity in the far-field precipitation 118 elements (which would not be detectable if the images 116(1) and 116(2) were to have been simultaneously captured), thereby allowing for the detection of precipitation 118 in the images 116(1) and 116(2) using disparity data.

Figure 8:
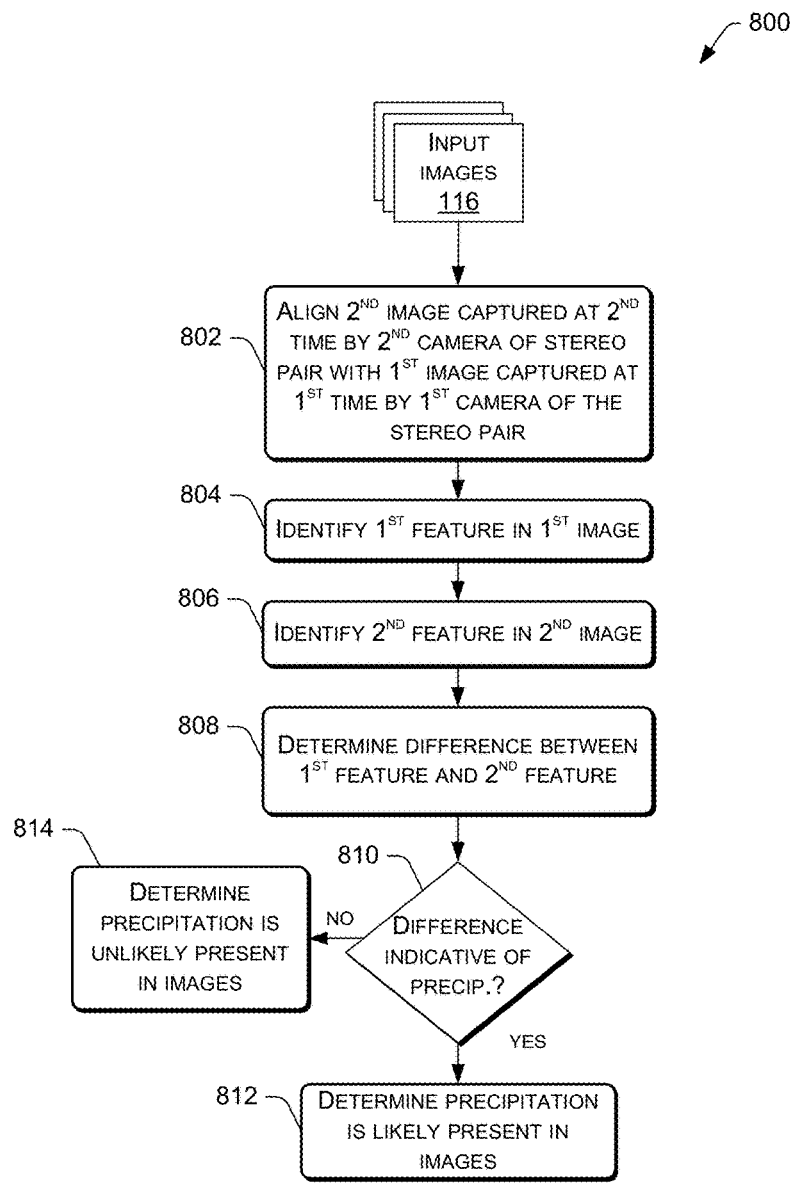
FIG. 8 is a flow diagram of an illustrative process for detecting precipitation in images based on a stereo disparity based detection technique.

FIG. 8 is a flow diagram of an illustrative process 800 for detecting precipitation 118 in images 116 based on a stereo disparity based detection technique. For discussion purposes, the process 800 is described with reference to the UAV 100 and the architecture 200 of FIG. 2. Furthermore, the process 800 can represent a sub-process of block 312 of the process 300 where the stereo disparity based detection scheme is implemented in the process 300.

At 802, the precipitation detector 226 can receive, or otherwise select, two images 116 captured at different times by a stereo pair of cameras 110, and perform an alignment operation where the second image captured at a second time, $t_2$, is aligned with a first image captured at a first time, $t_1$. For example, the second image 116(2) shown in FIG. 7 can be aligned with the first image 116(1) shown in FIG. 7. Similar to the alignment operation of block 602 of the process 600, the alignment operation at 802 can be based on the notion that the UAV 100 is moving (i.e., in flight) as the input images 116 are being captured. Therefore, if the camera system 112 (mounted to a moving UAV 100) is moving through an environment 104, two image frames captured sequentially (i.e., at different times) will not capture the same scene 120. In some embodiments, the alignment operation at 802 can be based on known movement parameters relating to the UAV 100, such as the UAV's 100 velocity/speed, pose, altitude, and the like, as determined from output(s) of one or more of the UAV sensors 208, such as an IMU. For example, a determination of how much to adjust the second image frame left, right, up, and/or down to align the second image frame with the first image frame can be based on such movement-related information. Furthermore, because the first image 116(1) is captured by the first camera 110(1) and the second image 116(2) is captured by the second camera 110(2), and because the first camera 110(1) and the second camera 110(2) are spaced a known distance apart from each other, the alignment operation at 802 can be further based in part on the known distance of separation between the cameras 110(1) and 110(2) of the stereo pair. For example, an amount of adjustment in a left or right direction can be based on the known distance of separation between the stereo pair of cameras. In some embodiments, alignment of images can comprise superimposing the images after an adjustment of one or both images.

At 804, the precipitation detector 226 can identify a first feature in the first image 116(1) captured at the first time, $t_1$, by the first camera 110(1). The precipitation detector 226, at 804, can analyze the input image 116(1) for features in the image that correspond to precipitation elements (e.g., raindrops, snowflakes, etc.) using any suitable feature detection algorithm. Feature detection in this context can be based on geometry, shape, size, color, contrast, and so on, of pixels and/or groups of pixels in the input images. It is to be appreciated that identification of a first feature can comprise identification of a first set of features.

At 806, the precipitation detector 226 can identify a second feature in the second image 116(2) captured at the second time, $t_2$, by the second camera 110(1), the second feature corresponding to the first feature. It is to be appreciated that identification of a second feature can comprise identification of a second set of features. Any suitable stereo matching algorithm can be used to identify matching or corresponding features between two stereo images. In some embodiments, the identification of the second feature in the second image 116(2) can be based on a location within the first image 116(1) where the first feature was found at 804. For example, the identification of the second feature in the second image 116(2) at 806 can look in the vicinity of a corresponding location of the aligned second image 116(2), such as within a threshold distance from the same location where the first feature was found in the first image 116(1). In some embodiments, the feature matching technique can account for the fact that precipitation generally falls under gravity, and therefore, a matching feature in a second image frame captured at a time that is after a time of capturing a first image frame will have moved in a direction that has a vertical component in the downward direction if the camera 110 is oriented in an upright manner. Wind can cause sideways movement of precipitation, and in rare cases, upward movement, but in most cases, precipitation moves in a downward direction, so feature matching algorithms can analyze a vicinity in the second image that is slightly below a location where a precipitation feature was detected in the first image.

At 808, the precipitation detector 226 can determine a difference between the first feature identified at 804 and the second feature identified at 806. Because precipitation, when present in the environment 104, is usually omnipresent in the scene volume, the difference determined at 808 can be repeated for additional precipitation features that are identified and matched between the first image 116(1) and the second image 116(2). In some embodiments, disparity data can be used to generate a depth map, such as in the form of a 3D point cloud, which includes the precipitation elements throughout the volume of the scene 120.

At 810, the precipitation detector 226 can determine if precipitation is likely present in the input images 116(1) and 116(2) based at least in part on the difference between the first feature and the second feature determined at 808. In some embodiments, the features identified at 804 and 806 can represent far-field features (or features in the background of the image. As noted above, far-field precipitation 118 features beyond a threshold distance from the stereo pair of cameras 110(1) and 110(2) do not exhibit detectable disparity in simultaneously captured stereo image pairs, but disparity with respect to far-field (or background) features can be exhibited in sequentially captured stereo image pairs (i.e., a left image captured at an earlier time than a right image, for example). Accordingly, the determination at 810 can determine whether there is any disparity between background features in the first image 116(1) and the second image 116(2). "Background" features can be determined from a segmentation algorithm that separates background features from foreground features in an image based on an estimated distance of the features from the camera system 112, such as the stereo pair of cameras 110(1) and 110(2) that capture the input images 116(1) and 116(2).

As another example, the determination at 810 can determine an amount of disparity between multiple matching (or corresponding) features between the first image 116(1) and the second image 116(2). As there may be more disparity between precipitation 118 features in sequentially captured stereo image pairs than the amount of disparity that is typically found in simultaneously captured stereo image pairs, a determination at 810 that a total disparity value between multiple first features in the first image 116(1) and multiple second features in the second image 116(2) is above a threshold disparity can indicate that precipitation is present in the scene 120. Alternatively, a first stereo pair of images can be captured simultaneously and a second stereo pair of images (e.g., the first image 116(1) and the second image 116(2)) can be captured sequentially (i.e., at different times with some time delay in between). The disparity between precipitation features in the pair of sequentially captured stereo images 116(1) and 116(2) can be compared to the disparity between precipitation features in the pair of simultaneously captured stereo images. If the difference between the compared disparities is greater than a threshold difference, such a condition may be indicative of precipitation being present in the sequentially captured stereo image pair 116(1) and 116(2).

As yet another example, multiple pairs of sequentially captured stereo images at varying time delays can be used to determine disparity data between matching features respective stereo image pairs, and the disparity data can be used by the 3D point cloud generator 220 to generate a 3D point cloud from any two sequentially captured stereo images. These 3D point clouds can then be compared to determine a degree of difference between any two 3D point clouds. A large difference can be indicative of a large amount of moving objects in the scene 120, or a high probability of precipitation 118 being present in the images 116(1) and 116(2). For example, a first pair of stereo images can be captured at different times separated by a first time delay, and a second pair of stereo images can be captured at different times separated by a second time delay that is different (e.g., greater than or less than) from the first time delay. First disparity data of the first pair of stereo images can be used to generate a first 3D point cloud and second disparity data can be used to generate a second 3D point cloud. A degree of difference between the first 3D point cloud and the second 3D point cloud can be determined by comparing the first and second 3D point clouds. If the difference between the point clouds is greater than a threshold difference, such a condition can be indicative of precipitation being present in the environment 104.

Accordingly, if, at 810, it is determined that the difference determined at 808 is indicative of the presence of precipitation in the input images 116(1) and 116(2), the process 800 follows the "yes" route to 812 where a determination is made that precipitation is likely present in the images 116(1) and 116(2). In regards to the process 300, this can represent the determination at 314 that precipitation is detected in the input images 116 based on the stereo disparity based detection scheme. In the example of FIG. 3, the multi-stage process 300 can continue to block 316 to generate a reconstructed image 122. Again, a positive determination at 810 (i.e., following the "yes" route from 810) can be based on determining a disparity between a first feature in the first image 116(1) and a second feature in the second image 116(2) (e.g., disparity between background features), determining that an amount of disparity between multiple features in the respective images exceeds a threshold disparity, determining that a difference between the disparity of the respective images that are sequentially captured and a disparity of another pair of simultaneously captured images exceeds a threshold difference, and/or determining that a difference between 3D point clouds computed from disparity data of respective stereo pairs of images exceeds a threshold difference.

If, at 810, the precipitation detector 226 determines that the difference between the first feature and the second feature determined at 808 is not indicative of precipitation, the process 800 follows the "no" route from 810 to 814 where a determination is made that precipitation is not likely to be present in the images 116(1) and 116(2). In regards to the process 300, this can represent at determination at 314 that precipitation is not detected in the input images 116(1) and 116(2) based on the stereo disparity based detection scheme, which can cause the process 300 to bypass block 316 without performing any precipitation removal operations on the input images 116(1) and 116(2).

FIG. 9 is a flow diagram of an illustrative process 900 for generating a reconstructed image 122 with precipitation at least partially removed therefrom. For discussion purposes, the process 900 is described with reference to the UAV 100 and the architecture 200 of FIG. 2. Furthermore, the process 900 can represent a sub-process of block 316 of the process 300, beginning from the point in the process 300 where precipitation 118 has been detected in the input image(s) 116 via one or more stages of the multi-stage approach to precipitation detection.

At 902, the image reconstruction module 228 can identify a first set of pixels in the first image 116(1) of a stereo image pair that include the precipitation 118. In some embodiments, the result of block 902 can be to create a mask superimposed on the first image 116(1) that differentiates pixels without precipitation from the first set of pixels that include the precipitation 118.

At 904, the image reconstruction module 228 can identify a second set of pixels in the second image 116(2) corresponding to the first set of pixels that do not include the precipitation 118. An example technique for identifying corresponding pixels between two images of a stereo image pair is to apply the mask created as a result of step 902 to the second image 116(2) to identify the pixels in the second image 116(2) that correspond to the first set of pixels 116(1) identified in the first image 116(1). Some or all of the corresponding pixels may not include precipitation features. Those pixels without precipitation features can be identified at 904.

At 906, the image reconstruction module 228 can replace first set of pixels in the first image 116(1) with the second set of pixels from the second image 116(2) to generate the reconstructed image 122 with at least some, if not all, of the precipitation 118 removed from the first image 116(1). Thus, the spatial redundancy provided between stereo image pairs allows for generating a reconstructed image 122 without the precipitation 118 occluding real objects 124 of interest in the scene, or with the precipitation 118 occluding the real objects 124 to a lesser degree.

FIG. 10 is a flow diagram of an illustrative process 1000 for generating a reconstructed image 122 with precipitation 118 at least partially removed therefrom according to another embodiment. For discussion purposes, the process 1000 is described with reference to the UAV 100 and the architecture 200 of FIG. 2. Furthermore, the process 1000 can represent a sub-process of block 316 of the process 300, beginning from the point in the process 300 where precipitation 118 has been detected in the input image(s) 116 via implementation of the noise pattern based detection scheme at 304.

At 1002, after spatial domain data of an input image 116 has been transformed into frequency domain data (e.g., at block 502 of the process 500), a portion of the frequency domain data within a predetermined frequency range indicative of the presence of precipitation 118 in the image 116 can be identified.

At 1004, the image reconstruction module 228 can out the portion of the frequency domain data identified at 1002 to obtain filtered frequency domain data (or a filtered frequency image) representing the image 116 in the frequency domain. Thus, the image reconstruction module 228 can act as a band-pass filter in order to "de-noise" the input image at 1004.

At 1006, the image reconstruction module 228 can transforming the filtered frequency domain data into new spatial domain data of the reconstructed image 122. The reconstructed image 122 having been "de-noised" at block 1004, is a clearer image with real objects of interest in the scene less occluded, or not occluded at all, by the precipitation 118 present in the input image 116.

FIG. 11 is a flow diagram of an illustrative process 1100 for generating a reconstructed image 122 with precipitation at least partially removed therefrom according to another embodiment. For discussion purposes, the process 1100 is described with reference to the UAV 100 and the architecture 200 of FIG. 2. Furthermore, the process 1100 can represent a sub-process of block 316 of the process 300, beginning from the point in the process 300 where precipitation 118 has been detected in the input image(s) 116 via one or more stages of the multi-stage approach to precipitation detection.

At 1102, a second image 116(2) captured at a second time by a second camera 110(2) of a stereo pair of cameras can be aligned with a first image 116(1) captured at a first time by a first camera 110(1) of the stereo pair.

At 1104, first features in the first image 116(1) that match second features in the second image 116(2) can be identified that are presented in both images 116(1) and 116(2) at corresponding locations. For example, real objects 124 of interest in the scene 124 can be identified by a feature detection algorithm. The real objects 124 will tend not to move, if inanimate, between the sequentially captured stereo image pair 116(1) and 116(2), whereas precipitation 118 will tend to move between the first image 116(1) and the second image 116(2). Thus, most of the precipitation 118 will not present at the same location in both images 116(1) and 116(2), while inanimate, real objects 124 of interest will present at the same location.

At 1106, the image reconstruction module 228 can retain the features identified at 1104 that present in corresponding locations in both the first image 116(1) and the second image 116(2), and not retain (or discard) the remaining features that present at different locations, or otherwise do not present in corresponding locations in both of the images 116(1) and 116(2). Thus, a reconstructed image 122 can be generated by the process 1100 having a reduced amount of precipitation 118 or precipitation 118 eliminated.

FIG. 12 is a flow diagram of an illustrative process 1200 for generating a reconstructed image 122 with precipitation at least partially removed therefrom according to another embodiment. For discussion purposes, the process 1200 is described with reference to the UAV 100 and the architecture 200 of FIG. 2. Furthermore, the process 1200 can represent a sub-process of block 316 of the process 300, beginning from the point in the process 300 where precipitation 118 has been detected in the input image(s) 116 via one or more stages of the multi-stage approach to precipitation detection.

Another approach to eliminate occlusion due to precipitation in input images 116 is to vary the delay time between capturing respective images of a stereo image pair to adopt a value for the delay time that is sufficiently long so that precipitation will not create a stereo pair point in a 3D point cloud generated from the stereo image pair. The process 1200 outlines such a technique.

At 1202, a new first image can be captured by a first camera 110(1) of a stereo pair of cameras at a first time, $t_1$.

At 1204, a new second image can be captured by a second camera 110(2) of the stereo pair of cameras at a second time, $t_2$. The lapse of time between the first time, $t_1$, and the second time, $t_2$, can be predetermined to be sufficiently long to avoid the inclusion of points in a 3D point cloud that represent precipitation.

At 1206, the 3D point cloud generator 220 can generate a 3D point cloud based on the first image captured at 1202 and the second image captured at 1204. The 3D point cloud, having been computing from sequentially captured stereo images that were delayed by a predetermined amount of time results in a 3D point cloud that does not include points corresponding to precipitation. Thus, for purposes of this disclosure, a reconstructed image 122 can comprise a 3D point cloud that is representative of the scene 120 captured in a stereo image pair.

FIG. 13 is a flow diagram of an illustrative process 1300 for determining a weather condition of an environment 104 of the UAV 100 based on a characteristic of an image captured by a camera system 112 of the UAV 100. For discussion purposes, the process 1300 is described with reference to the UAV 100 and the architecture 200 of FIG. 2.

At 1302, the camera system 112 of the UAV 100 can capture one or more images 116 of the environment 104 of the UAV 100. For example, a single camera 110 can be used to capture video (i.e., multiple sequential image frames at a particular frame rate), or one or more still images at sequential times. Alternatively, multiple cameras 110 can be used to capture multiple images 116 of the environment, such as two cameras directed in opposite directions (e.g., one camera pointed North, another camera pointed South), a stereo pair of cameras generally directed in the same direction, or any other combination of any number of cameras 110.

At 1304, the weather condition detector 230 can determine a characteristic of at least one image 116 from image data 216 associated with the at least one image 116. The characteristic can be any suitable type of image characteristic that is known to a person having ordinary skill in the art as derivable from image data 216, such as the example characteristics described herein, including, without limitation, brightness (luminance), color, contrast, blur, as well as features (e.g., objects, textures, geometric shapes, etc.) in the image(s). As an illustrative example, the characteristic determined from image data 216 at 1304 can comprise a brightness level of the image 116.

At 1306, the weather condition detector 230 can determine a weather condition of the environment 104 of the UAV 100 based at least in part on the characteristic of the at least one image 116. Continuing with the above example, the characteristic can comprise a brightness level such that the weather condition detector 230, with reference to the weather condition data 232, can determine a range of brightness levels that the brightness level is included within, and determine a weather condition associated with the brightness levels. For example, a sunny weather condition can be associated with a first range of brightness levels, while a cloudy weather condition can be associated with a second range of brightness levels. In some embodiments, the determination at 1306 can include determining whether the image(s) 116 captured at 1302 was captured with or without active illumination, which may influence the characteristic determined at 1304, such as brightness level. In some embodiments, a precipitation weather condition can be determined based on a brightness level characteristic associated with an image captured with active illumination provided by a light source of the camera system 112. For example, when it is snowing in the environment 104 of the UAV 100, and the camera system 112 uses an active illumination light source (e.g., a flash bulb) to provide additional illumination to the scene 120, the reflection from the falling snowflakes can cause a brightness level of the captured image to exceed those typically associated with a sunny day. If not determinative of the weather condition, the characteristic can at least be used with additional information to determine the weather condition at 1306, such as additional images captured by the camera system 112, output from the UAV sensor(s) 208, and so on.

In the scenario where output from the UAV sensor(s) 208 is considered in the determination at 1306, the one or more UAV sensors 208 can provide output based on at least one of a level of a weather related parameter (e.g., wind speed, temperature, etc.), a velocity of the UAV 100 (e.g., detected by an accelerometer), or an audible signal, and the determination of the weather condition at 1306 can be further based on the output provided by the UAV sensor(s) 208. For example, temperature and/or wind speed can be used as augmentative information that informs the weather condition detector 230 of the most likely weather condition given a preliminary determination from the image characteristic(s). Additionally, velocity of the UAV 100 given a known power output can be indicative of a strong headwind or similar wind-related conditions. A microphone of the UAV 100 can also be used to detect audible signals associated with wind (e.g., audio signals above a particular threshold (e.g., measured in Decibels (dBs)) can be indicative of windy conditions.

Accordingly, in some embodiments multiple images 116 can be captured by multiple cameras 110 of the camera system 112 at 1302 and multiple characteristics can be determined at 1304, such that the determination of the weather condition at 1306 is based at least in part on the multiple characteristics determined at 1304. In some embodiments, the weather condition determined at 1306 can be provided at any level of granularity or detail, such as a highest level of detail (e.g., sunny weather condition, precipitation weather condition, cloudy weather condition, etc.), or a lower level of detail (e.g., sunny weather condition with the sun shining from the East). In order to enable lower level details of weather conditions (e.g., directionality of the sun), multiple characteristics, such as a first brightness level of a first image 116 captured by a first camera 110(1) and a second brightness level of a second image 116 captured by a second camera 110(2), can be determined at 1304, and the weather condition detector 230 can determine a direction of the sun relative to the UAV based on the multiple brightness levels. For example, a first camera 110(1) pointed due East during a sunrise on a clear day can capture a first image 116 having a high brightness level if the sun is glaring directly into the first camera 110(1), and a second camera pointed due West can capture a second image 116 at or near the same time as the first image 116 was captured, the second image 116 having a lower brightness level as compared to the relatively high brightness level of the first image 116 that captures the sun in the scene 120. Thus, a determination of the direction of the sun relative to the UAV 100 can be based on the relative brightness levels associated with the multiple images 116 captured by the multiple cameras 110.

The process 1300, in an example scenario, can use flare detection for determining a weather condition. For example, stray light from a bright light source, such as the sun, can take various paths into the lens of a camera 110 and onto the image sensor such that image artifacts known as "flare" can be generated by the image pixels that are affected by the stray light. Accordingly, the characteristic(s) determined at 1304 of the process 1300 can comprise color or brightness differences between portions of a single image. That is, if the image data 216 associated with an image captured at 1302 indicates a high brightness region and a low brightness region, or a first region having a particular color and a second region having a different color that are indicative of flare characteristics, the determination at 1306 can comprise determining a sunny weather condition. In some embodiments, such image characteristics across multiple images from multiple cameras 110 directed in different directions can lead to a determination of a weather condition on a more detailed level, such as very sunny, sunny, or a little sunny (i.e., high, medium, and low, levels of a sunny weather condition).

In another example scenario, the process 1300 can determine image characteristics including features detected in the image(s) at 1304 to aid in the determination of the weather condition at 1306, or to provide further granularity to the weather condition determination at 1306. For example, features such as moving clouds between multiple captured images, a flag, tree, or similar object blowing in the wind (i.e., leaning or pointing in a particular direction), waves on the surface of water such as lakes, the ocean, etc., can be used to deduce a directionality of wind (e.g., wind blowing from East to West).

Figure 14:
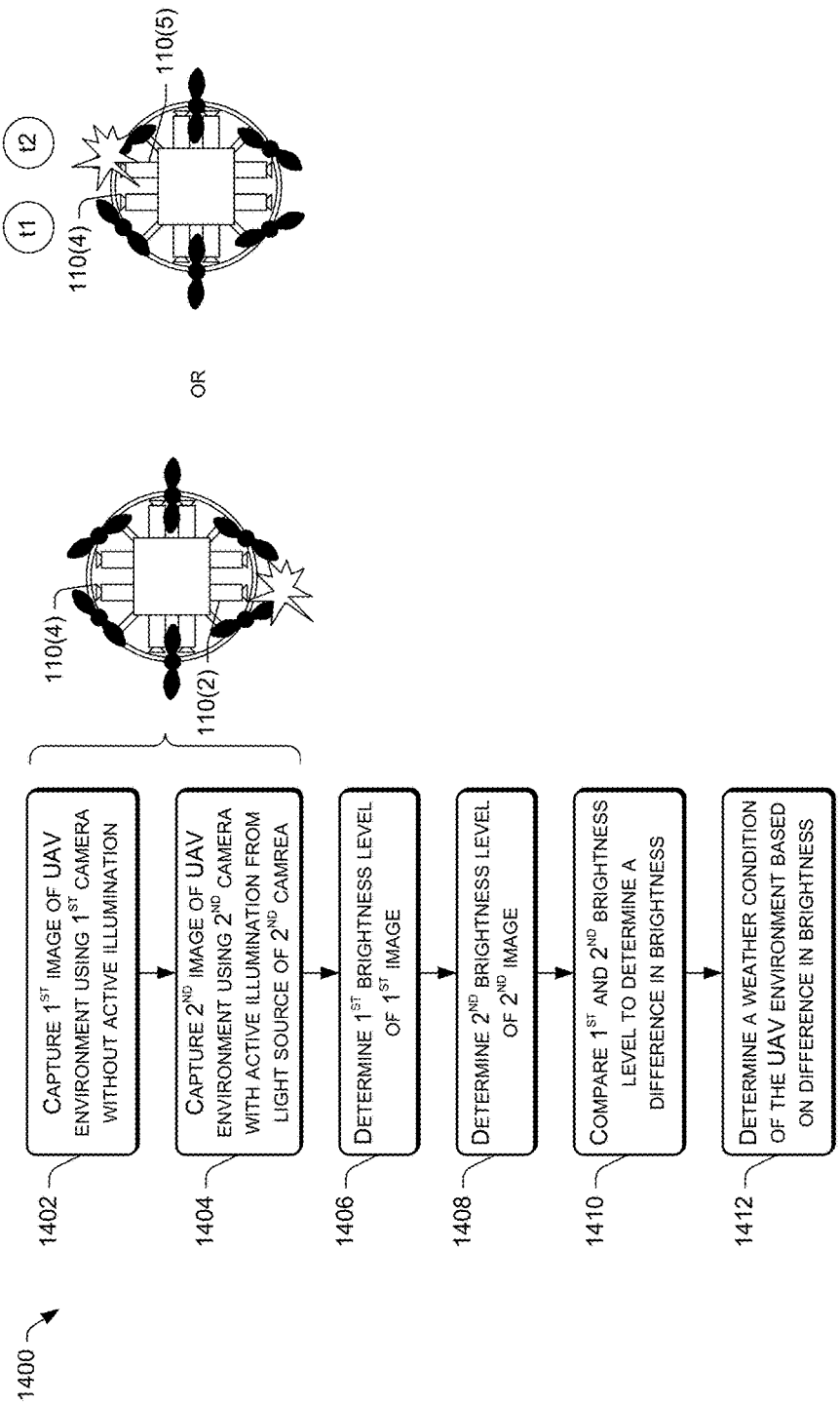
FIG. 14 is a flow diagram of an illustrative process for determining a weather condition of an environment of the UAV based on characteristics of images captured by multiple cameras of the UAV.

FIG. 14 is a flow diagram of an illustrative process 1400 for determining a weather condition of an environment 104 of the UAV 100 based on characteristics of images 116 captured by multiple cameras 110 of the UAV 100. For discussion purposes, the process 1400 is described with reference to the UAV 100 and the architecture 200 of FIG. 2.

At 1402, a first camera 110 captures a first image of the UAV's 100 environment 104 without active illumination. At 1404, a second camera 110, having a light source for active illumination, captures a second image of the UAV's 100 environment 104 at 1404 with active illumination provided by the light source of the second camera 110. The schematic to the right of blocks 1402 and 1404 illustrates two, non-limiting examples of capturing two different images with two different cameras 110 of the UAV 100. In a first example, a first camera 110(4) captures the first image without active illumination at 1402, while a second camera 110(2) captures the second image with active illumination, as shown by the flash by the second camera 110(2). The first and second images can be captured at the same time or at different times. Using cameras facing opposite directions (e.g., North and South, respectively) allows for capturing two images simultaneously, or at nearly the same time, without the active illumination of one camera significantly affecting the characteristic of the image captured by the other camera without active illumination. In a second example shown in FIG. 14, a first camera 110(4) captures the first image without active illumination at 1402 at a first time, $t_1$, while a second camera 110(5) captures a second image at 1404 at a second time, $t_2$, and with active illumination. By capturing the first and second images at different times, cameras that are facing the same direction, or directions within about 90 degrees of each other (e.g., North and West) can be utilized to capture the first and second images at 1402 and 1404 without the active illumination of one camera affecting the characteristic of the image captured without active illumination.

At 1406, the weather condition detector 230 can determine a first brightness level from first image data associated with the first image. At 1408, the weather condition detector 230 can determine a second brightness level from second image data associated with the second image.

At 1410, the weather condition detector 230 can compare the first brightness level to the second brightness level to determine a difference in brightness between the first image and the second image. For example, the brightness levels can be subtracted to determine a difference in brightness level.

At 1412, the weather condition detector 230 can determine a weather condition of an environment 104 of the UAV based at least in part on the difference in brightness determined at 1410 (i.e., a result of the comparison of the two image characteristics). In an illustrative scenario, if it is raining or snowing in the environment 104 of the UAV 100, the first brightness level of the first image captured without active illumination may be relatively low, while the second brightness level of the second image captured with active illumination may be much higher than the first brightness level due to the reflection of light off of the precipitation elements (e.g., raindrops, snowflakes, etc.). The difference in brightness exceeding a threshold difference may be indicative of a precipitation weather condition, while a difference in in brightness below the threshold difference may be indicative of another weather condition (e.g., a sunny weather condition where active illumination may not discernably alter the brightness level of a scene, such that the difference in brightness between the first image and the second image on a sunny day may not be very high). In a scenario where the difference in brightness determined at 1410 does not exceed a threshold difference, a determination at 1412 of a sunny weather condition can further comprise determining that the first brightness level exceeds a threshold brightness level. That is, if the brightness of the first image under ambient lighting conditions (i.e., without active illumination) is above a threshold brightness level, such a condition may indicate that the weather condition is sunny.

In addition to using active illumination in the process 1400 as a means of varying camera parameters in the process of capturing the image at 1404, other camera parameters can be varied as well. For example, gain, exposure, and other camera variables that can be controlled/varied during image capture.

Figure 15:
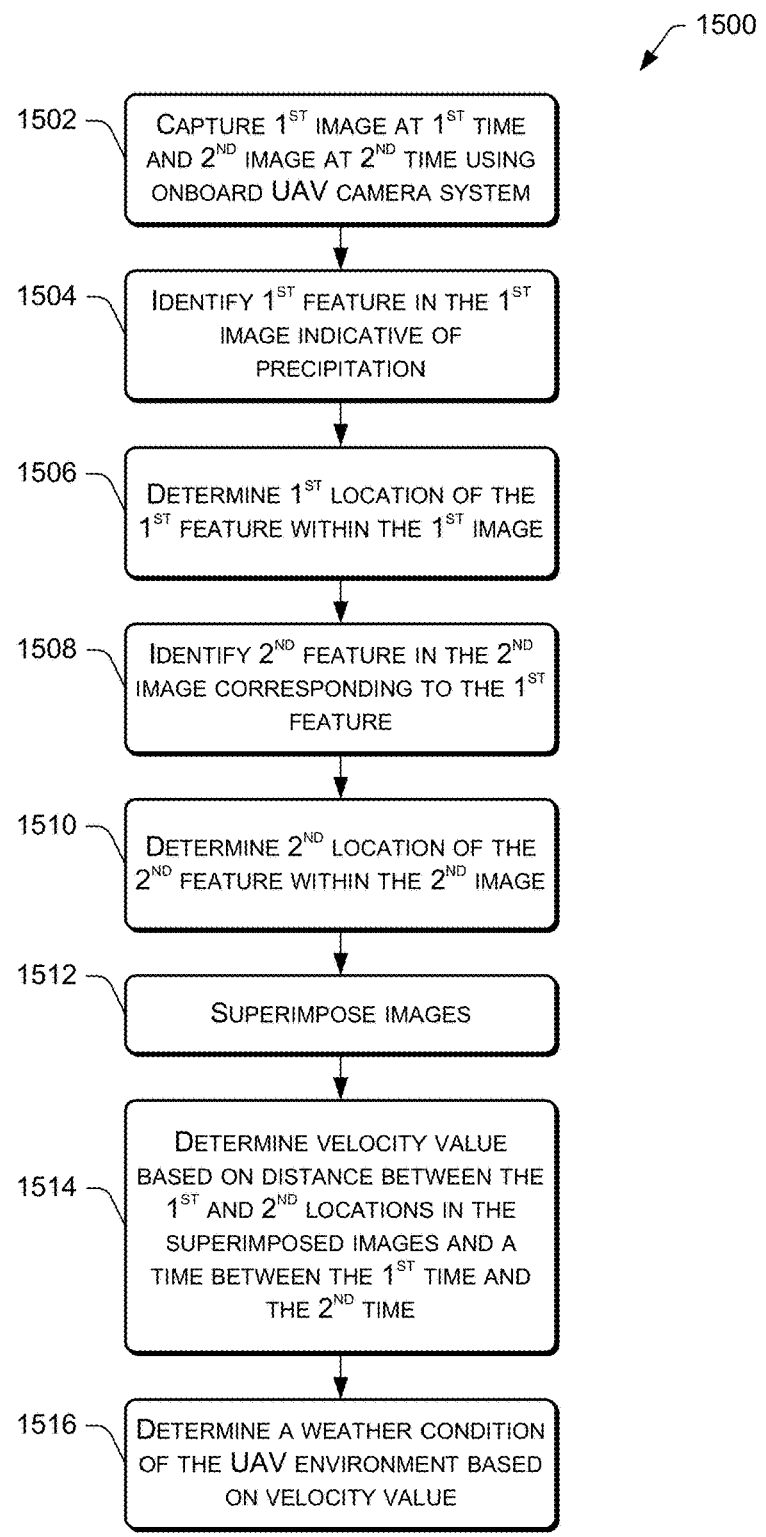
FIG. 15 is a flow diagram of an illustrative process for determining a weather condition of an environment of the UAV based on characteristics of multiple images captured by a camera system of the UAV.

FIG. 15 is a flow diagram of an illustrative process 1500 for determining a weather condition of an environment 104 of the UAV 100 based on characteristics of multiple images 116 captured by a camera system 112 of the UAV 100. For discussion purposes, the process 1500 is described with reference to the UAV 100 and the architecture 200 of FIG. 2.

At 1502, the camera system 112 of the UAV 100 can capture a first image at a first time, $t_1$, and a second image at a second time, $t_2$, that is different from the first time, $t_1$. The first image and the second image can be captured by a single camera 110 or multiple different cameras 110.

At 1504, the weather condition detector 230 can identify a first feature in the first image that is indicative of precipitation. Any suitable feature detection technique can be used to detect the first feature, as described herein. The first feature detected at 1504 can have a size, shape, color, and so on, consistent with precipitation.

At 1506, the weather condition detector 230 can determining a first location of the first feature within the first image. For example, a pixel location referenced by an x, y coordinate, or group of pixels referenced in a similar manner can be located in association with where the first feature presents itself in the first image.

At 1508, the weather condition detector 230 can identify a second feature in the second image that corresponds to the first feature. Any suitable feature matching algorithm or technique can be used to identify a matching (or corresponding) feature in the second image to that of the first feature in the first image, as described herein.

At 1510, the weather condition detector 230 can determine a second location of the second feature within the second image. This can be accomplished in a similar manner to the location determination of the first feature in the first image at 1506.

At 1512, the weather condition detector 230 can superimpose the second image onto the first image to obtain superimposed images. This allows for comparing matching features between the two images in order to determine how far and/or how fast the feature has moved between the two images.

At 1514, the weather condition detector 230 can determine a velocity value based at least in part on a distance between the first location and the second location in the superimposed images and a time between the first time and the second time. For example, the distance between the first location and the second location when the images are superimposed on one another (measured in any suitable unit of measurement) can be divided by a time difference between the first time the first image was captured and a second time the second image was captured.

At 1516, the weather condition detector 230 can determine a weather condition based at least in part on the velocity value determined at 1514. For example, velocity values of precipitation elements can be mapped to weather conditions in the weather condition data 232. For instance, raindrops (or a rainy weather condition) can be associated with a higher velocity value than snowflakes (or a snowy weather condition). Accordingly, the weather condition detector 230 can determine a type of precipitation based on a velocity that features are moving from frame to frame in an image sequence (e.g., video) captured by the camera system 112. Additional information can also be considered at 1516 to provide more detail to the weather condition determined, such as a severity level of the precipitation weather condition based on visibility of objects 124 in the scene 120. For example, during heavy rain, objects 124 in the scene 120 are less visible, and during light rain, objects 124 in the scene 120 are more visible. Accordingly, a level of severity of the precipitation weather condition can be based at least in part on edge detection of objects, contrast determinations, and the like from image data 216 of the captured images. The severity level can be used to classify precipitation into categories such as heavy, medium, or light precipitation.

Figure 16:
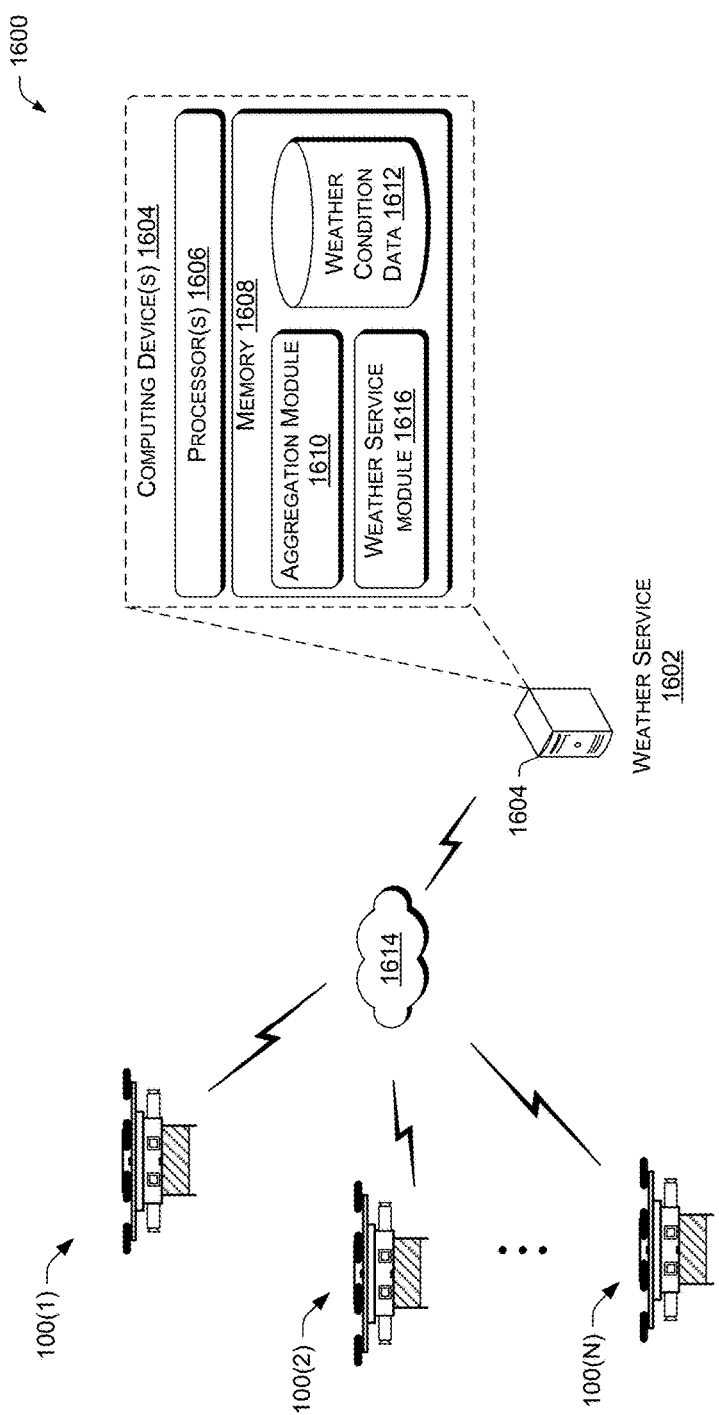
FIG. 16 illustrates an example computer environment for implementing a weather service based on weather conditions from a fleet of UAVs.

FIG. 16 illustrates an example computer environment 1600 for implementing a weather service based on weather conditions from a fleet of UAVs 100. A service provider can implement a weather service 1602, at least partly, via one or more computing devices 1604 equipped with a processor(s) 1606 and non-transitory computer-readable memory 1608 storing modules, components, programs, instructions, data and the like, that are executable by the processor(s) 1606 for carrying out various aspects of the weather service 1602. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The memory 1608 can include an aggregation module 1610 configured to receive weather condition determinations (e.g., weather logs) from a plurality of UAVs 100(1), 100(2), . . . , 100(N) (collectively 100) over a computer network 1614, and to aggregate and store this received data as weather condition data 1612. The computer network(s) 1614 is representative of many different types of networks, and may include wired and/or wireless networks that enable communications between the various computing devices in the environment 1600. In some embodiments, the computer network(s) 1614 may include cable networks, the Internet, local area networks (LANs), wide area networks (WAN), mobile telephone networks (MTNs), and other types of networks, possibly used in conjunction with one another, to facilitate communication between the UAVs 100 and any other computing device, such as the computing device 1604 of the weather service 1602. Although embodiments are described in the context of a web based system, other types of client/server-based communications and associated application logic could be used.

With the weather condition data 1612 aggregated from a plurality of UAVs 100, the weather service 1602 can provide, via a weather service module 1616, access to the weather condition data 1612 as a weather service 1602 for consumption by any authorized entity, or to the general public. As the UAVs 100 traverse the airspace at various altitudes for any suitable purpose (e.g., for delivering packages 106 on various delivery routes), the UAVs 100 can create and maintain individual weather logs, as described herein, and transmit the weather condition data in the weather logs to the computing device(s) 1604 of the weather service 1602 at multiple different times (e.g., periodically, or in response to trigger events, such as polling from the computing device(s) 104 or when the UAV 100 is within a coverage area of a radio access network to provide the data over the computer network 1614. The data received by the aggregation module 1610 can be packaged together across multiple UAVs and provided as a weather service 1602 to any suitable entity, such as a government, agriculture entities, forest service entities, oceanic entities, the general public, or any entity that might be interested in the weather service 1602.

Utilization of a fleet of UAVs 100 to provide such weather condition data 1612 allows for such entities to discover (e.g., search and browse) "micro" weather reports in addition to "macro" weather reports. For example, a fleet of UAVs 100 deployed in the airspace for any suitable purposes can be utilized as a "sensor net" to allow weather reporting on various levels of granularity, including a micro level, such as an area with about a 1 mile radius. This allows an entity to discover weather conditions in a neighborhood, for example, which may not be available from another weather service.

Particular weather condition determinations can be discovered using the weather service 1602 that might not be available from any other source. For example, a fleet of UAVs 100 on the order of thousands of UAVs 100 can be spread over a city, each UAV 100 collecting weather condition data and various weather condition parameters, including wind speed. Upon aggregating this data at the computing device(s) 1604 of the weather service 1602, the weather service module 1616 can provide information about flow patterns, wind currents, and the like, across an area that might not be discoverable through other sensing means. Such information may help predict weather anomalies like tornados, hurricanes, and other weather conditions that pose a safety concern to the public.

Those skilled in the art will appreciate that the UAVs 100, computing architectures and environments are merely illustrative and are not intended to limit the scope of the present disclosure. In particular, any combination of hardware or software that can perform the indicated functions may be included as part of the UAV 100 and/or the architecture 200. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Some or all of the system components or data structures may also be stored (e.g., as instructions or structured data) on a non-transitory, computer-accessible medium or a portable article to be read by an appropriate drive on the UAV 100. Various implementations may further include receiving, sending, or storing instructions and/or data implemented in accordance with the foregoing description upon a computer-accessible medium. Accordingly, the techniques described herein may be practiced with other configurations.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An image processing system to remove precipitation from images captured by cameras mounted on an unmanned aerial vehicle (UAV) comprising:
   a first camera of a stereo pair of cameras mounted on the UAV, the first camera being configured to capture multiple first image frames at a first frame rate;
   a second camera of the stereo pair of cameras configured to capture multiple second image frames at a second frame rate, wherein the first camera and the second camera do not capture image frames simultaneously, and wherein the second camera is spaced a known distance from the first camera; and
   a processor configured to:
      determine, in a first stage of multiple stages, a presence of the precipitation in the images using a noise pattern based detection scheme;
      confirm, in a second stage of the multiple stages, the presence of the precipitation determined in the first stage using a stereo disparity based detection scheme that comprises:
         aligning a second image frame of the multiple second image frames with a first image frame of the multiple first image frames based at least in part on the known distance at which the second camera is spaced from the first camera;
         identifying multiple first features in the first image frame that are indicative of the precipitation;
         identifying multiple second features in the second image frame that correspond to the multiple first features;
         determining a difference between the multiple first features and the multiple second features; and
         determining that the first image frame and the second image frame include the precipitation based at least in part on the difference; and
      generate, using image data associated with the first image frame or the second image frame, a reconstructed image frame without depiction of the precipitation, or with depiction of a lesser amount of the precipitation than an amount of the precipitation depicted in the first image frame or the second image frame.

2. The image processing system of claim 1, wherein determining, in the first stage, the presence of the precipitation in the images using the noise pattern based detection scheme comprises:
   transforming spatial domain data of at least one of the first image frame or the second image frame into frequency domain data;
   identifying a portion of the frequency domain data that is within a predetermined frequency range associated with the presence of the precipitation in the first image frame or the second image frame; and
   determining that the first image frame or the second image frame includes the precipitation based at least in part on identifying the portion of the frequency domain data that is within the predetermined frequency range.

3. The image processing system of claim 1, wherein the processor is further configured to classify the precipitation at a severity level among multiple possible severity levels based at least in part on visibility of an object in the first image frame or the second image frame, and wherein generating the reconstructed image frame is based at least in part on classifying the precipitation at the severity level.

4. The image processing system of claim 1, wherein the processor is further configured to generate the reconstructed image frame by:
   identifying a first set of pixels in the first image frame that include the precipitation;
   identifying a second set of pixels in the second image frame corresponding to the first set of pixels that do not include the precipitation; and
   replacing the first set of pixels in the first image frame with the second set of pixels from the second image frame to generate the reconstructed image frame.

5. A system comprising:
   a first image capture device;
   a second image capture device spaced a known distance from the first image capture device; and
   a processor configured to:
      determine, in a first stage of multiple stages, a presence of precipitation in images captured by the first image capture device and the second image capture device using a frame difference based detection scheme that compares patterns of features in multiple ones of the images;
      confirm, in a second stage of the multiple stages, the presence of the precipitation determined in the first stage by:
         aligning a first image captured by the first image capture device with a second image captured by the second image capture device based at least in part on the known distance at which the second image capture device is spaced from the first image capture device, the first image having been captured at a first time, and the second image having been captured at a second time that is different from the first time;
         identifying a first feature in the first image;
         identifying a second feature in the second image that corresponds to the first feature; and
         determining that the precipitation is present in the first image and the second image based at least in part on a difference between the first feature and the second feature; and generate a reconstructed image without the precipitation or with an amount of the precipitation that is less than an original amount of the precipitation in the first image or the second image.

6. The system of claim 5, the processor being further configured to determine, in a third stage of the multiple stages, the presence of the precipitation by:
   transforming spatial domain data of at least one of the first image or the second image into frequency domain data;
   identifying a portion of the frequency domain data that is within a predetermined frequency range associated with the presence of the precipitation in the first image or the second image; and
   determining that the precipitation is present in the first image or the second image based on identifying the portion of the frequency domain data that is within the predetermined frequency range.

7. The system of claim 5, wherein determining, in the first stage, the presence of the precipitation in the images using the frame difference based detection scheme comprises:
   identifying a first pattern of first features in the first image;
   identifying a second pattern of second features in a third image captured at a third time by the first image capture device, the third time being different from the first time;
   determining a difference between the first pattern and the second pattern; and
   determining that the precipitation is present in the first image based at least in part on the difference between the first pattern and the second pattern.

8. The system of claim 5, the processor being further configured to classify the precipitation at a severity level among multiple possible severity levels based at least in part on visibility of an object in the first image or the second image, and wherein generating the reconstructed image is based at least in part on classifying the precipitation at the severity level.

9. The system of claim 5, wherein determining, in the first stage, the presence of the precipitation in the images using the frame difference based detection scheme comprises:
   identifying a first pattern of first features in the first image;
   identifying a second pattern of second features in the second image;
   determining a difference between the first pattern and the second pattern; and
   determining that the precipitation is present in the first image and the second image based at least in part on the difference between the first pattern and the second pattern.

10. The system of claim 5, wherein the processor is further configured to generate the reconstructed image by:
    identifying a first set of pixels in the first image that include the precipitation;
    identifying a second set of pixels in the second image corresponding to the first set of pixels that do not include the precipitation; and
    replacing the first set of pixels in the first image with the second set of pixels from the second image to generate the reconstructed image.

11. The system of claim 6, wherein the processor is further configured to generate the reconstructed image by:
    filtering out the portion of the frequency domain data to obtain filtered frequency domain data; and
    transforming the filtered frequency domain data into new spatial domain data of the reconstructed image.

12. The system of claim 5, further comprising a communications connection to receive weather report information over a computer network, the processor being further configured to:
- determine, prior to determining the presence of the precipitation in the first stage and based at least in part on the weather report information received via the communications connection, a probability of precipitation being present in an environment of the system,
- wherein the processor is configured to generate the reconstructed image in response to determining that the probability of precipitation being present in the environment is greater than a threshold probability.

13. The system of claim 5, further comprising a sensor to detect a level of a weather related parameter in an environment of the system, the sensor comprising at least one of a humidity sensor, a barometer, a temperature sensor, or a wind speed sensor, the processor being further configured to:
- determine, prior to determining the presence of the precipitation in the first stage and based on the level of the weather related parameter detected by the sensor, a probability of precipitation being present in the environment of the system,
- wherein the processor is configured to generate the reconstructed image in response to determining that the probability of precipitation being present in the environment is greater than a threshold probability.

14. The system of claim 5, the processor being further configured to:
- generate a three-dimensional (3D) point cloud based on the images captured by the first image capture device and the second image capture device over a time period;
- measure a level of degradation of the 3D point cloud over the time period; and
- determine, prior to determining the presence of the precipitation in the first stage and based on the level of degradation of the 3D point cloud, a probability of precipitation being present in an environment of the system,
- wherein the processor is configured to generate the reconstructed image in response to determining that the probability of precipitation being present in the environment is greater than a threshold probability.

15. The system of claim 5, wherein the first image capture device and the second image capture device are mounted on a moving vehicle.

16. The system of claim 15, wherein the moving vehicle comprises an unmanned aerial vehicle (UAV).

17. A method comprising:
- receiving, by a processor, multiple images of a scene, the multiple images captured by a stereo pair of cameras onboard an unmanned aerial vehicle (UAV;
- determining, in a first stage of multiple stages, a presence of precipitation in the scene using a noise pattern based detection scheme;
- confirming, in a second stage of the multiple stages, the presence of the precipitation determined in the first stage by:
  - aligning, by the processor, a first image of the multiple images with a second image of the multiple images based at least in part on a known distance between a first camera and a second camera of the stereo pair of cameras, the first image having been captured by the first camera at a first time, and the second image having been captured by the second camera at a second time that is different from the first time;
  - identifying, by the processor, a first feature in the first image;
  - identifying, by the processor, a second feature in the second image that corresponds to the first feature in the first image; and
  - determining the presence of the precipitation in the scene based at least in part on a difference between the first feature and the second feature; and
- generating, by the processor, a reconstructed image of the scene, the reconstructed image showing the scene without the precipitation, or the scene with a lesser amount of the precipitation than an amount of the precipitation in at least one image of the multiple images.

18. The method of claim 17, further comprising:
- generating a three-dimensional (3D) point cloud based on the multiple images captured by the first camera and the second camera over a time period;
- measuring a level of degradation of the 3D point cloud over the time period; and
- determining, prior to determining the presence of the precipitation in the first stage and based on the level of degradation of the 3D point cloud, a probability of precipitation being present in an environment of the UAV,
- wherein the reconstructed image is generated in response to determining that the probability of precipitation being present in the environment is greater than a threshold probability.

19. The method of claim 17, wherein:
- identifying the first feature comprises identifying the first feature as a first background feature in the first image;
- determining the second feature comprises identifying the second feature as a second background feature in the second image; and
- determining the presence of the precipitation in the scene based at least in part on the difference comprises determining a disparity between the first feature and the second feature.

20. The method of claim 17, wherein determining, in the first stage, the presence of the precipitation in the scene using the noise pattern based detection scheme comprises:
- transforming spatial domain data of at least one of the first image or the second image into frequency domain data;
- identifying a portion of the frequency domain data that is within a predetermined frequency range associated with the presence of the precipitation in the first image or the second image; and
- determining the presence of the precipitation in the scene based at least in part on identifying the portion of the frequency domain data that is within the predetermined frequency range.

* * * * *